United States Patent
Zoetelief et al.

(10) Patent No.: US 12,539,674 B2
(45) Date of Patent: Feb. 3, 2026

(54) CONTROLLING TOOLPATH FOR ADDITIVE MANUFACTURING APPARATUS TO CREATE A LOAD-BEARING STRUCTURE

(71) Applicant: Covestro (Netherlands) B.V., Geleen (NL)

(72) Inventors: Wilhelmus Frederikus Zoetelief, Helmond (NL); Lucien Douven, Sittard (NL); Bart-Jan Van Der Gaag, Ouddorp (NL); Merijn De Leur, Amstelveen (NL)

(73) Assignee: Stratasys, Inc., Minnetonka, MN (US)

( * ) Notice: Subject to any disclaimer, the term of this patent is extended or adjusted under 35 U.S.C. 154(b) by 406 days.

(21) Appl. No.: 18/259,505

(22) PCT Filed: Dec. 23, 2021

(86) PCT No.: PCT/EP2021/087526
§ 371 (c)(1),
(2) Date: Jun. 27, 2023

(87) PCT Pub. No.: WO2022/144309
PCT Pub. Date: Jul. 7, 2022

(65) Prior Publication Data
US 2024/0051232 A1    Feb. 15, 2024

(30) Foreign Application Priority Data
Dec. 28, 2020    (EP) .................................. 20217386

(51) Int. Cl.
*B29C 64/393* (2017.01)
*B29C 64/236* (2017.01)
*B33Y 50/02* (2015.01)

(52) U.S. Cl.
CPC .......... *B29C 64/393* (2017.08); *B29C 64/236* (2017.08); *B33Y 50/02* (2014.12)

(58) Field of Classification Search
CPC .................................................. B29C 64/393
See application file for complete search history.

(56) References Cited

U.S. PATENT DOCUMENTS

| 10,052,813 B2 | 8/2018 | Armijo et al. |
| 10,076,870 B1 | 9/2018 | August et al. |

(Continued)

FOREIGN PATENT DOCUMENTS

| CN | 109719932 A | * | 5/2019 | |
| IT | 201600132698 A1 | * | 6/2018 | ............ C08J 7/0427 |
| WO | 2021242966 A1 | | 12/2021 | |

OTHER PUBLICATIONS

International Search Report and Written Opinion dated Apr. 21, 2022 from corresponding International Application No. PCT/EP2021/087526, filed Dec. 23, 2021.

Primary Examiner — Suresh Suryawanshi
(74) Attorney, Agent, or Firm — Westman, Champlin & Koehler, P.A.

(57) ABSTRACT

Aspects are described for use in additive manufacturing. A desired manufacturing path may be specified for a 3D model of an object to manufacture via additive manufacturing. The object may be a load-bearing structure. The desired manufacturing path may be based on the expected mechanical stress on the object. Slicing the 3D model may provide toolpath segments corresponding to a toolpath of an additive manufacturing apparatus. The toolpath segments may be sorted and oriented based on the desired manufacturing paths. Additive manufacturing control instructions may be generated based on the sorted and oriented toolpath segments. The additive manufacturing control instructions may be used to control the toolpath of an additive manufacturing apparatus in accordance with the desired manufacturing paths when manufacturing the object via an additive manufacturing process.

11 Claims, 11 Drawing Sheets

(56) References Cited

U.S. PATENT DOCUMENTS

| | | | |
|---|---|---|---|
| 10,195,786 | B1 | 2/2019 | Armijo et al. |
| 10,364,341 | B2 | 7/2019 | Bheda et al. |
| 10,415,898 | B1 | 9/2019 | Sunden |
| 10,421,267 | B2 | 9/2019 | Reese et al. |
| 10,703,042 | B2 | 7/2020 | Armijo et al. |
| 10,800,095 | B2 | 10/2020 | Reese et al. |
| 10,843,403 | B2 | 11/2020 | Reese et al. |
| 11,084,276 | B2 | 8/2021 | Reese et al. |
| 11,207,824 | B2 | 12/2021 | Reese et al. |
| 11,207,825 | B2 | 12/2021 | Reese et al. |
| 11,312,068 | B2 | 4/2022 | August et al. |
| 2015/0251356 | A1 | 9/2015 | Batchelder |
| 2019/0315067 | A1 | 10/2019 | Babu et al. |
| 2020/0086624 | A1* | 3/2020 | Daynes .................... B32B 5/14 |
| 2020/0159186 | A1 | 5/2020 | King et al. |
| 2020/0198227 | A1* | 6/2020 | Bold ...................... B64C 1/064 |
| 2020/0230888 | A1* | 7/2020 | Kim ...................... B29C 64/393 |
| 2021/0055710 | A1* | 2/2021 | Borish ............... G05B 19/4099 |
| 2021/0388609 | A1* | 12/2021 | Li ........................ E01D 19/125 |

* cited by examiner

CONTROLLING TOOLPATH FOR ADDITIVE MANUFACTURING APPARATUS TO CREATE A LOAD-BEARING STRUCTURE

CROSS-REFERENCE TO RELATED APPLICATION

This Application is a Section 371 National Stage Application of International Application No. PCT/EP2021/087526, filed Dec. 23, 2021 and published as WO 2022/144309 A1 on Jul. 7, 2022, in English, which claims the benefit of European patent application 20217386.0, which was filed on Dec. 28, 2020; the contents of each of which are hereby incorporated by reference in their entirety.

TECHNICAL FIELD

Aspects of the present disclosures generally relate to additive manufacturing and relate, more particularly, to improved approaches for controlling toolpaths for an additive manufacturing apparatus.

BACKGROUND

Additive manufacturing is a process for creating three-dimensional (3D) objects, typically in accordance with computer data representative of an idealized model of such object, by forming successive layers of material according to the desired object topology. The types of materials used in additive manufacturing can include plastics, metals, powders, liquids, and composite materials. One specific example of an additive manufacturing process is stereolithography, which involves the selective application of actinic radiation (typically via a laser or through digitally-processed light from an LED source) upon the surface of a liquid radiation curable thermoset material. In other powder-based methods, such as selective laser sintering (SLS), the additive manufacturing process involves the controlled application of a high density, high energy source of radiation, such as a laser, to selectively melt or fuse a portion of particulate material into a desired shape. Yet another non-limiting example of additive manufacturing includes extrusion-based processes, known among the names fused deposition modeling (FDM) or fused filament fabrication (FFF). In FDM/FFF processes, a filament of polymeric material is driven through a heated nozzle until it locally melts, after which the molten material is selectively deposited dropwise and/or extruded onto a substrate or layer of previously-deposited material in accordance with the shape of a desired three-dimensional object. A related method which utilizes granules instead of filaments is known as a fused granular fabrication (FGF) process. Of course other types and variations of the aforementioned additive manufacturing processes exist.

SUMMARY

Applications of additive manufacturing have evolved. While some early applications involved desktop publishing to 3D print novelty items, some current applications use additive manufacturing to create more sophisticated objects and structures having functional utility which are designed for real-world use. Potential examples include components for load-bearing structures such as one or more elements of buildings, tunnels, roads, bridges, walls, dams, automobiles, trains, boats, planes, and even furniture In the case of load-bearing structures, structural engineers may design them to withstand the expected mechanical stress, and their corresponding 3D models may exhibit geometries influenced by the expected mechanical stress. Those 3D geometries may include, for example, the size, dimensions, shape, configuration, and arrangement of the structure's components.

A bridge (or any component sub-structure thereto, such as a deck) is one example of a load-bearing structure, at least parts or all of which may be produced via additive manufacturing techniques. The corresponding 3D model for the bridge may define the 3D geometries of the bridge's exterior structures (e.g., outer surfaces), interior structures (e.g., infill components), and the connections between those exterior and interior structures. The expected mechanical stress on the bridge may result from forces of nature (e.g., gravity, wind) from its use (e.g., pedestrians and/or vehicles traversing the bridge). The 3D geometries of the bridge, as well as the properties of its build materials, may determine how well the bridge can withstand such strain. Structural engineers may thus take these considerations into account when designing the bridge and creating its corresponding 3D model. It has become apparent that the particular manner and method in which an object is manufactured can also influence its mechanical properties, even controlling for the same 3D geometry and build material. It has been discovered that this phenomenon is particularly pronounced in objects created via additive manufacturing techniques. Indeed two 3D-printed components having identical 3D geometry and composition can exhibit different mechanical performance depending on many factors influenced by the additive manufacturing build process itself.

As one non-limiting example, fiber-reinforced build materials may be used to provide additional structural integrity for a structure manufactured via additive manufacturing. In general, the fibers of an additive manufacturing build material typically lie along the same direction as the deposition path, such as would be the case in a filament material with a continuous fiber-reinforced core. It has also been observed that the structural integrity of an object additively manufactured with fiber-based build materials may be enhanced when the fibers lie along the same direction as the expected mechanical stress, for example, by improving tensile strength, modulus of elasticity, and the like. Accordingly, structural integrity may be enhanced by controlling the additive manufacturing apparatus such that the deposition path follows the direction of the expected mechanical stress.

Another non-limiting example of how the additive manufacturing build process can effect the final object properties includes the so-called inter-layer adhesion phenomenon. Layerwise manufacturing processes, such as many additive manufacturing techniques, typically build an entire layer in a defined (often XY) plane before commencing another layer to be stacked thereon. This stepwise process can impart anisotropic properties to the three-dimensional object. Anisotropy is the property of a material which allows it to change or assume different properties in different directions.

Three-dimensional objects created via certain layerwise processes typically possess superior mechanical properties in the X or Y direction than in the Z-direction, as the strength within a layer may be greater than the adhesive strength between successive layers. This is particularly acute in extrusion-based processes such as FFF and FGF, because the materials required for use therewith exhibit an inherent reduction in fusibility as they cool. Because adjoining regions in the XY plane typically are deposited together closer in time than adjoining regions in the Z-plane, adjoining layers (i.e. adjoining regions in the Z-plane) typically experience a greater temperature differential and therefore a greater tendency to exhibit reduced fusion. This fusion reduction is further exacerbated if the build chamber is not heated, the duration between application of subsequent layers is too large, and/or the build material involves semi-crystalline polymers, which are known to change morphology (i.e. crystallize) as they cool beyond a certain critical point. This aforementioned concern tends to be less pronounced in other additive manufacturing techniques such as stereolithography or SLS, because there, the selective application of energy onto a particular surface of material has an inherent tendency to extend into previously-formed layers, thereby inciting a previously-formed layer to chemically react or physically fuse with the currently-formed one. The problem is absent altogether in many non-additive manufacturing techniques, such as injection molding or machining, because individual layers of material are by definition not formed together at all.

Therefore, while structural engineers consider load conditions during the design phase, additive manufacturing systems are historically not designed or configured to account for that strain during the manufacturing phase. Furthermore, such systems do not account for the potential anisotropic variations introduced into an object depending on the manner in which is printed. Instead, some additive manufacturing systems may generate toolpaths based on other considerations (e.g., shortest toolpaths to minimize manufacturing speed) rather than toolpaths that would yield improved structural integrity. Accordingly, there exists a need to control the toolpaths of additive manufacturing systems such that the considerations that influence the design of a structure (e.g., expected mechanical stress, build materials, etc.) also can be accounted for during its manufacture via additive manufacturing processes. Additionally or alternatively, there exists an unmet need to provide additive manufacturing methods and systems capable of, for a controlled object geometry and material composition, prescribing toolpaths which yield improved or optimized physical properties to the three-dimensional objects created therefrom.

To overcome the challenges described above, the present disclosures describe techniques for controlling toolpaths during additive manufacturing. As described in further detail below, desired manufacturing paths along which to manufacture a structural object may be provided in advance of generating manufacturing control instructions for an additive manufacturing apparatus. The desired manufacturing paths may be specified in different ways. In one example, one or more guide curves may be provided that approximate a curve of a slice of the 3D model corresponding to the structure to be manufactured. In another example, a sequence of surfaces of the 3D model and/or boundary representations may be selected. After slicing the 3D model into its individual layers for manufacture, the desired manufacturing paths may be used sort and orient the toolpaths resulting from the slicing procedure. Manufacturing data may be generated indicating how those toolpaths are sorted and oriented. This manufacturing data may, in turn, be used to generate the manufacturing control instructions for an additive manufacturing apparatus used to manufacture the structure. The toolpath of the additive manufacturing apparatus, therefore, may be controlled to manufacture the object using the desired manufacturing paths initially specified and used to sort and orient the respective manufacturing toolpaths of the structure's individual layers. By controlling the toolpath of the additive manufacturing apparatus to follow desired manufacturing paths, the structure as manufactured should advantageously conform more closely to the structure as designed and may take into account the unique properties of the build materials used during manufacture. Where the structure is a load-bearing structure, such conformity may advantageously result in the structure successfully withstanding the expected mechanical stress identified when engineering its design.

The present disclosures also describe an iterative design process that is helpful to optimize designs and parameters associated with manufacturing an object using an additive manufacturing process. Performance simulations may evaluate whether specified manufacturing requirements are met within specified manufacturing constraints. If not, the part design, desired manufacturing paths, and/or related parameters may be modified in an iterative fashion until the specified manufacturing requirements are met. Additionally or alternatively, the performance simulations may be run against a set of potential part designs, desired manufacturing paths, and/or related parameters to identify those that meet the specified manufacturing requirements and those that do not thereby indicating which ones are optimized or otherwise suitable for the specified manufacturing requirements.

This summary is not intended to identify critical or essential features of the disclosures herein, but instead merely summarizes certain features and variations thereof. Other details and features will also be described in the sections that follow.

BRIEF DESCRIPTION OF THE DRAWINGS

This summary is not intended to identify critical or essential features of the disclosures herein, but instead merely summarizes certain features and variations thereof. Other details and features will also be described in the sections that follow.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Figure 1:
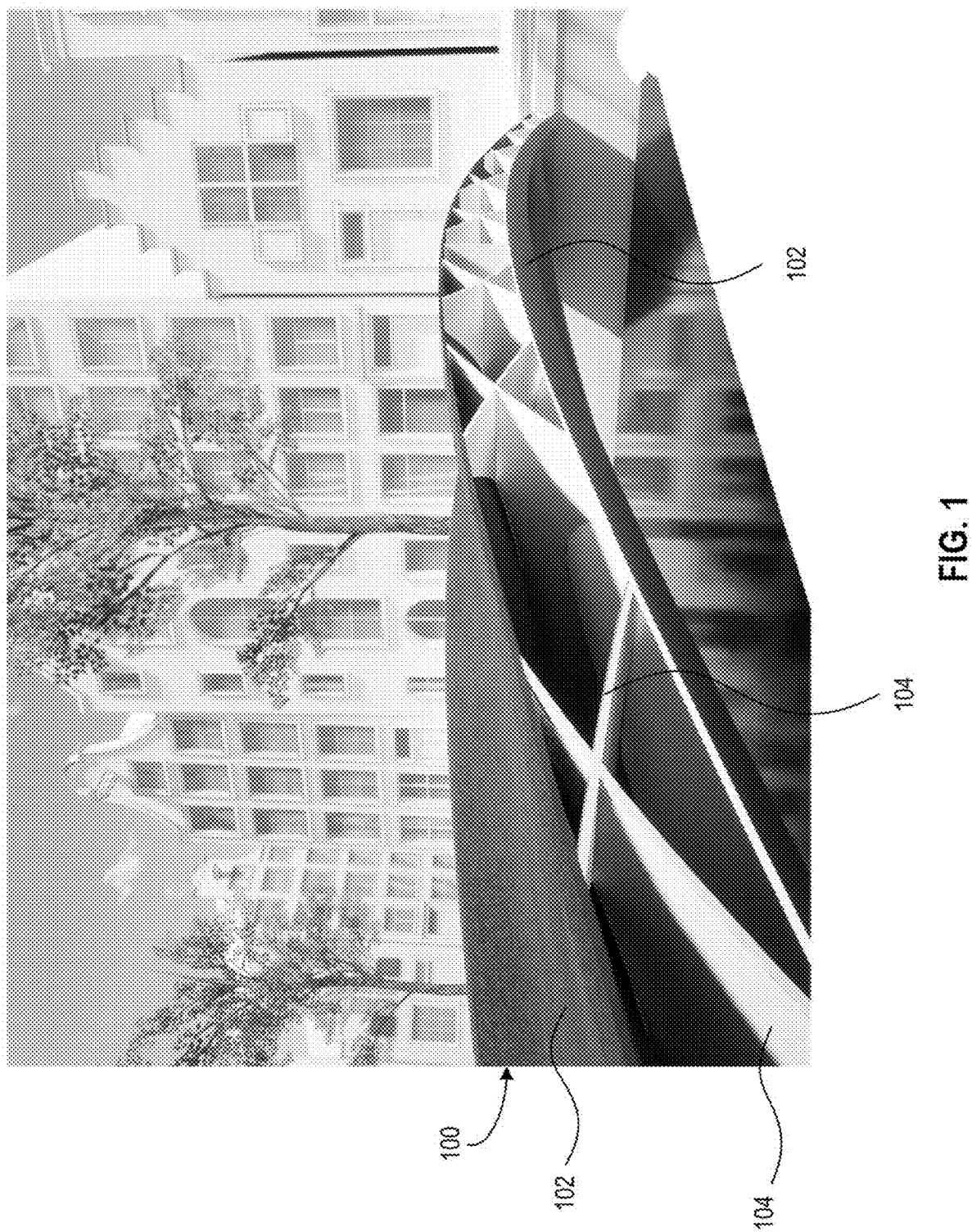
FIG. 1 shows an illustration of an example load-bearing structure that may be manufactured via additive manufacturing in accordance with aspects of the present disclosures.

As noted above, the present disclosures describe techniques for controlling toolpaths during additive manufacturing. The techniques described herein may be employed to manufacture via additive manufacturing structural, load-bearing objects such as bridges. FIG. 1, for example, shows an illustration of one type of load-bearing structural object, in this case a bridge 100, that may be manufactured using additive manufacturing. As seen in FIG. 1, the bridge 100 includes both exterior structures 102 and interior structures 104. The exterior structures 102, in this example, include the upper surface and lower surface of the bridge deck providing the pathway for pedestrians, vehicles, and the like. The interior structures 104, in this example, include a series of trusses or cross girders. The shape, arrangement, interconnections of structural object's interior and exterior structures may be referred to as the geometry of the structural object. That geometry may be defined in a digital model (e.g., a 3D model) of the structural object using computer-aided design (CAD) tools.

Structural objects manufactured using additive manufacturing techniques may include monolithic structures in which the build material contiguously forms the exterior and interior structures in an uninterrupted fashion. For example, the bridge 100 in FIG. 1 may be a monolithic structure formed via additive manufacturing. Structural objects manufactured using additive manufacturing techniques may also include the exterior structures and interior structures themselves, e.g., modular structures that are manufactured separately and later assembled to form the overall load-bearing, structural object. In another example, the exterior structures 102 (e.g., top surface or portions thereof) and the interior structures 104 (e.g., trusses or portions thereof) may be individually manufactured via additive manufacturing and reassembled at a build site. Accordingly, the bridge 100 shown is FIG. 1 is provided only by way of example to provide context for the present disclosures. Other types of object (e.g., non-load-bearing objects) may also be manufactured via additive manufacturing using the techniques described herein.

Figure 2A:
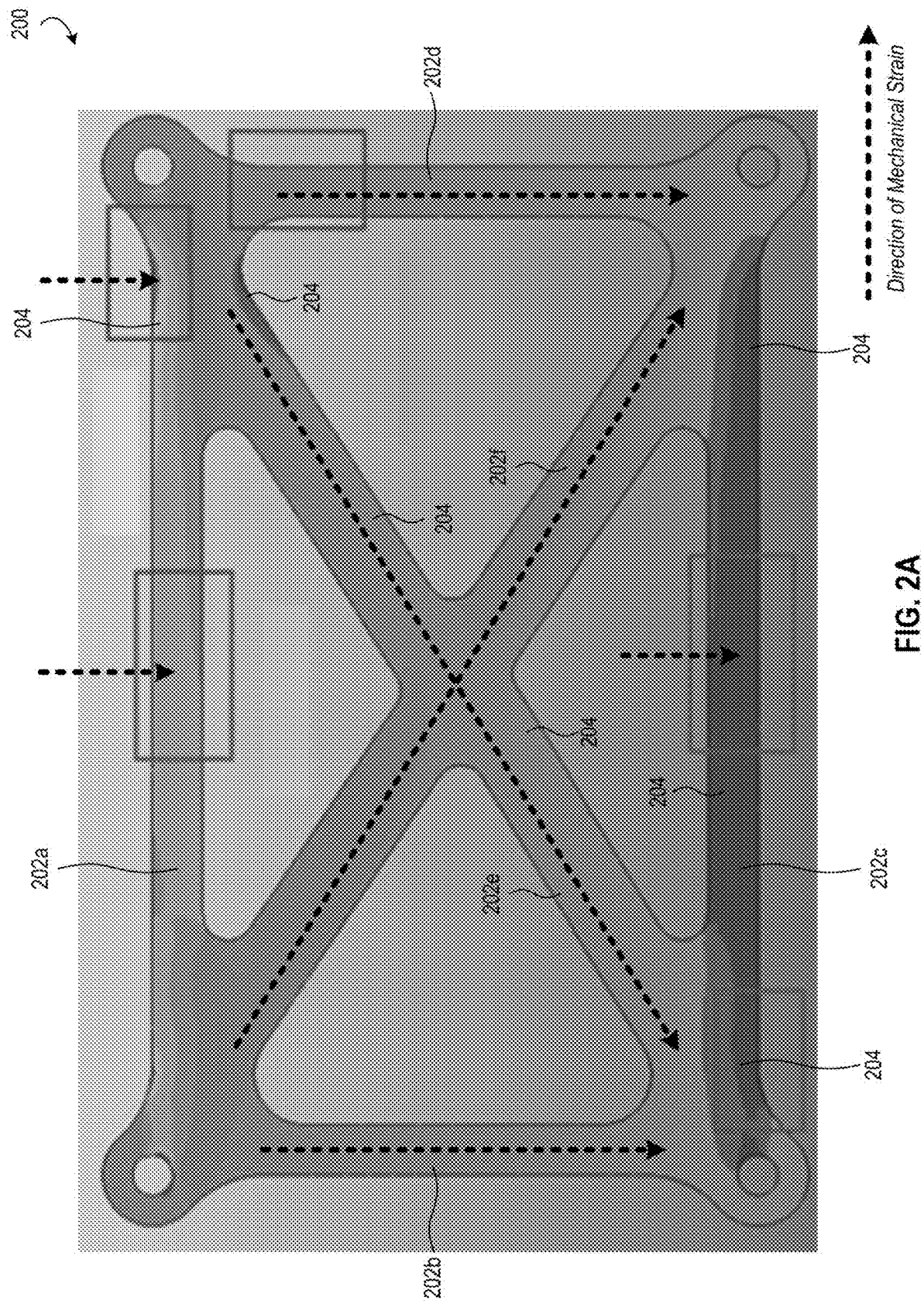
FIG. 2A shows an illustration of a cross-section of a 3D model of a load-bearing structure that may be manufactured via additive manufacturing in accordance with aspects of the present disclosures.

FIG. 2A shows an illustration of a cross-section of an example 3D model of a load-bearing structural component 200 that may be manufactured via additive manufacturing. It should be appreciated that a given cross-section of a 3D model for a given structural component may be a flat plane or a curved surface. The structural component 200, in this example, includes two pairs of parallel perimeter struts 202a and 202c (top/bottom) and 202b and 202d (left/right sides) and a pair of internal cross struts 202e and 202f. The dashed lines shown in FIG. 2A illustrate the direction of the mechanical stress that is expected on the structural component 200 due to the forces that are expected to act upon the structure. The coloring (shading) shown in FIG. 2A illustrates the effect of that mechanical stress on various regions 204 of the structural component 200. The directions of mechanical stress and affected regions shown in FIG. 2A are provided by way of example only in order to provide context for the present disclosures. The expected mechanical stress may influence the geometry of the structural component 200, e.g., the length, width, thickness, shape, curvature, quantity and configuration of interconnections, and the like.

The strength of the structural component 200 and its ability to withstand the expected mechanical stress may be improved by controlling the direction of a toolpath based on that expected mechanical stress during manufacture via additive manufacturing. In this way, structural engineers may apply their knowledge and skill to both the design of the structural component 200 as well as the manner in which it is ultimately manufactured in order to account for the expected mechanical stress on the object. As noted above, it has been observed that the fibers of a fiber-based build material typically lie along the direction of the toolpath as they are being deposited during an additive manufacture process. It has also been observed that structures manufactured with fiber-based build materials may better withstand mechanical stress when the fibers of its build materials lie in the same direction as the mechanical stress on the object, as they exhibit anisotropy. Accordingly, a structural engineer may desire to improve the structural integrity of a structural component by specifying a desired manufacturing path that follows the direction of the expected mechanical stress during deposition of the build material (e.g., so that the print direction follows the direction of the expected force).

In addition to the direction of mechanical stress, other aspects may affect the structural integrity of a structural component manufactured via additive manufacturing. For example, the cooling time, crystallization rate, etc. may impact the bonding, adhesion, or fusion between respective layers. For example, the strength of the bonds between successive layers of certain thermoplastic build materials may depend on the temperature of the layer. If a previous layer cools too much before the next layer is applied, a relatively weaker bond may result. To ensure a sufficient bond between the layers, it may be desirable to ensure the next layer is applied while the previous layer is within a threshold temperature during its molten phase. Accordingly, a structural engineer also may improve the overall structural integrity of a structural component by specifying a desired manufacturing path that is short enough to ensure a subsequent layer begins within a desired timeframe to account for the cooling time, crystallization rate, etc., of the build material.

Relatedly, it may be desirable to ensure relatively strong bonding in zones or regions of the structural component that are expected to experience relatively more mechanical stress. This may be achieved by depositing relatively more material in those zone or regions, e.g., by way of doubly thick walls and the like. Accordingly, a structural engineer may improve the structural integrity of certain zones or regions of a structure component by specifying a desired manufacturing path that results in additional build material being deposited in those zones or regions. In this regard, the desired manufacturing paths may be used to indicate one or more positions, areas, regions, or zones where new build material should be deposited earlier on a previous layer when forming a new layer. As one simple example with reference to FIG. 2A, to ensure a sufficient bond between layers at the region expected to experience the most mechanical stress, a desired manufacturing path may be specified that results in build material for a new layer being first deposited along the bottom perimeter strut 202c followed by the internal cross struts 202e-f and then at the remaining perimeter struts 202a, 202b, and 202d.

Figure 2B:
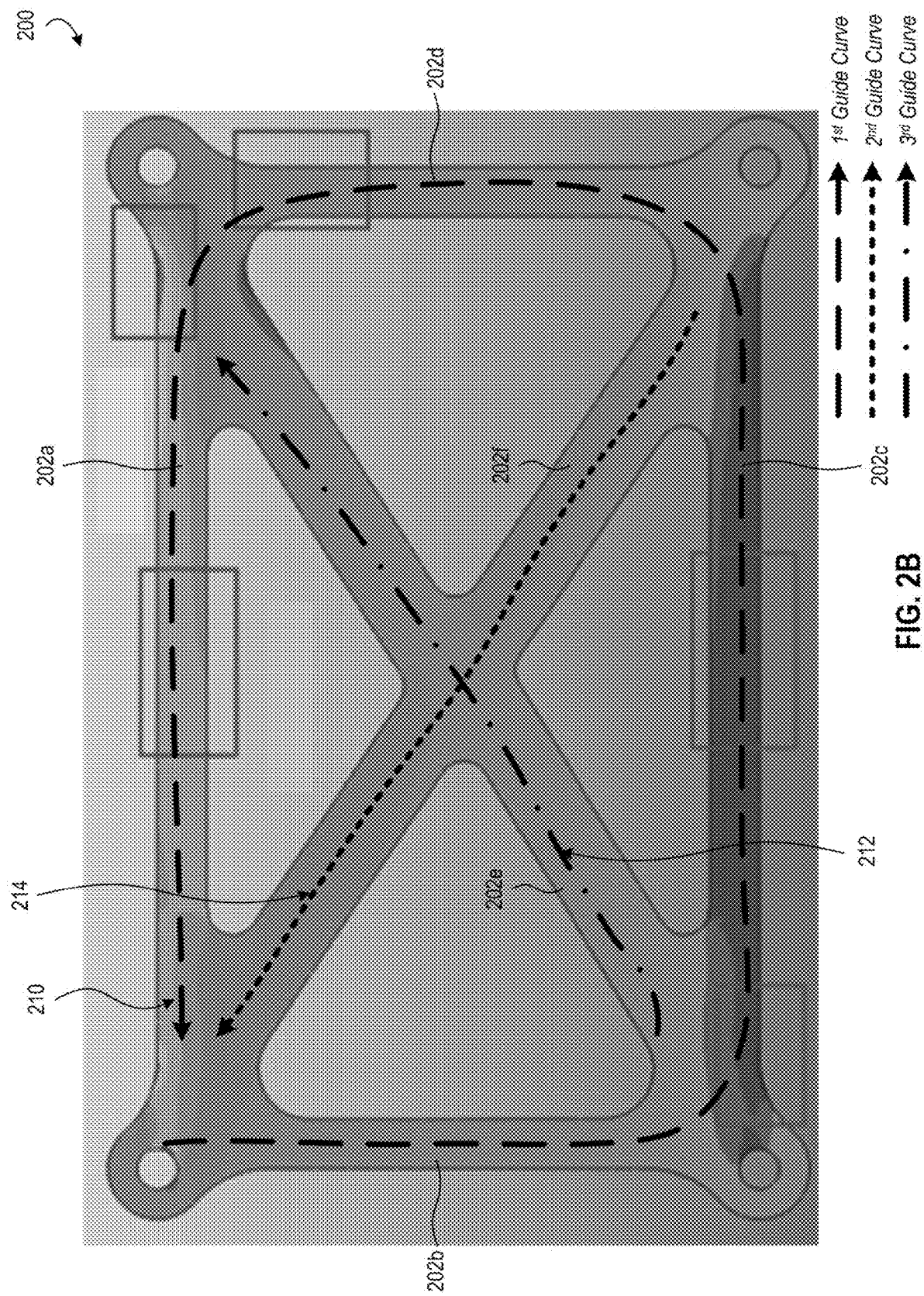
FIG. 2B shows an illustration of the cross-section of the 3D model of FIG. 2A with a first example approach to specify desired manufacturing paths.
Figure 2C:
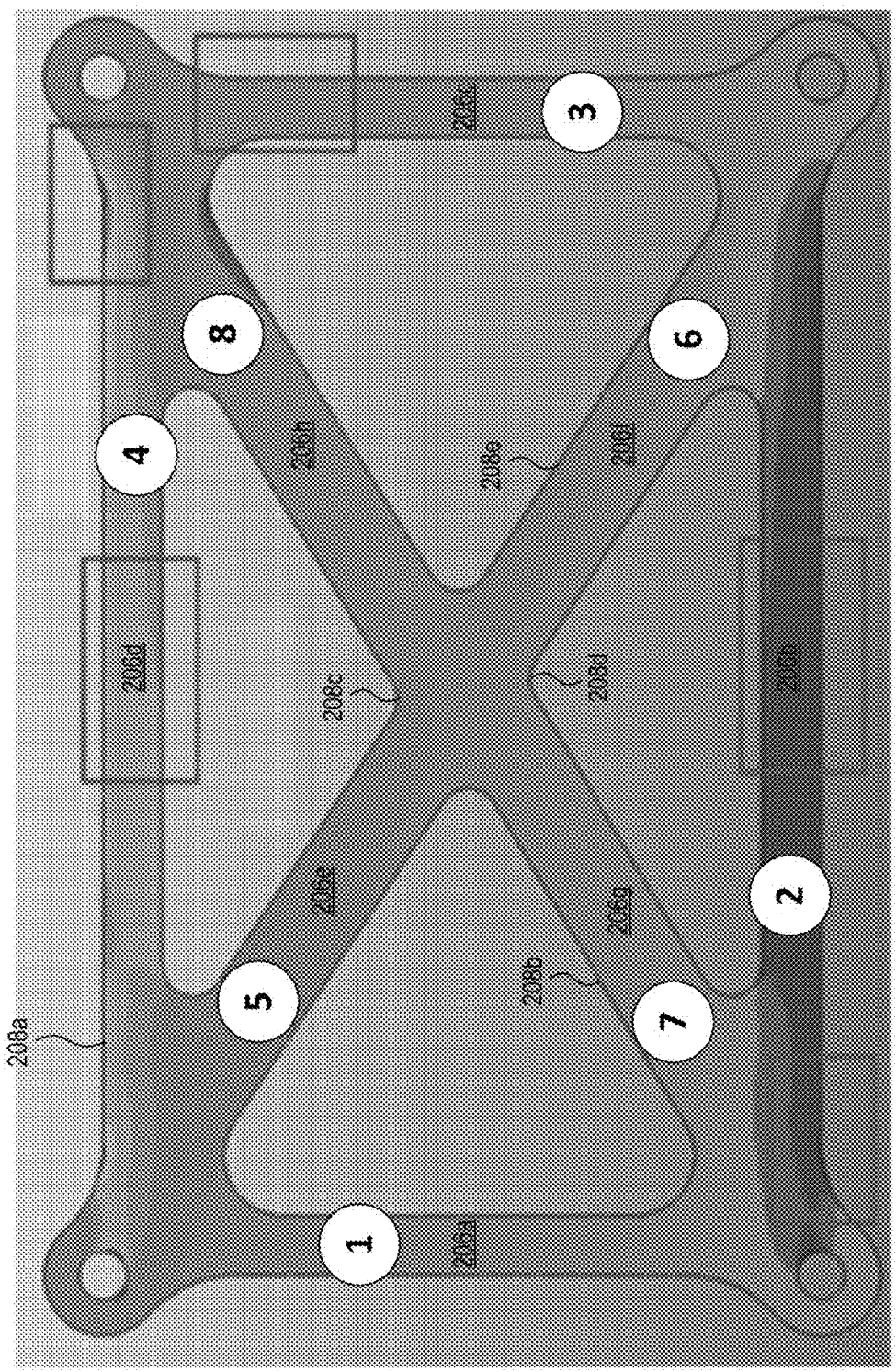
FIG. 2C shows an illustration of the cross-section of the 3D model of FIG. 2A with a second example approach to specify desired manufacturing paths.

More generally, structural engineers may specify desired manufacturing paths along which the structural object should be manufactured during additive manufacturing. It should be appreciated that the particular purpose or goal of a given desired manufacturing path may depend on the particular context in which the structural component is being manufactured, e.g., its intended use, its specific geometry, the build material(s) used, and the like. The desired manufacturing paths may be specified using different approaches. In one example approach, a structural engineer may define a curve having a specified direction that approximates a geometry (e.g., boundary, curve, surface, etc.) of the structural object's 3D model and is referred to herein as a "guide curve." The guide curve may be a straight line, a curved line, or incorporate both straight and curved portions. In another example approach, a structural engineer may select a sequence of surfaces and/or boundary representations of the object's 3D model. More generally, a desired manufacturing path may be specified by anything that indicates a desired toolpath for a nozzle of an additive manufacturing apparatus and that can be used to generate manufacturing control instructions for the additive manufacturing apparatus such that the nozzle follows the desired manufacturing path when depositing the build material during manufacture. The desired manufacturing path may be an explicit toolpath that the nozzle should strictly follow or a more general path that the nozzle should generally follow. FIGS. 2B-C illustrate respective examples of the two approaches to specifying desired manufacturing paths noted above.

FIG. 2B shows an illustration of the cross-section of a 3D model for the structural component 200 in which the first approach noted above, namely guide curves, is used to specify the desired manufacturing paths. In this example, three guide curves 210, 212, and 214 are shown. Guide curve 210, in this example, proceeds in a generally counterclockwise direction around the structural component 200 starting on perimeter strut 202*b*, through perimeter struts 202*c* and 202*d*, and ending on perimeter strut 202*a*. Guide curve 212, in this example, proceeds in a generally diagonal direction starting from the bottom-left and ending on the top-right of internal cross strut 202*e*. Similarly, guide curve 214, in this example, proceeds in a generally diagonal direction starting from the bottom-right and ending on the top-left of internal cross strut 202*f*. These guide curves 210-214 may thus indicate the desired manufacturing paths for the nozzle of an additive manufacturing apparatus during manufacture of the structural component 200. In turn, manufacturing control instructions may be generated based on these guide curves. The manufacturing instructions may include travel instructions to move the nozzle to position that corresponds to the start of a guide curve (e.g., the top of perimeter strut 202*b* for guide curve 210) and deposition instructions to deposit material at locations corresponding to the direction and curvature of the guide curve to a position that corresponds to the end of the guide curve (e.g., the left side of perimeter strut 202*a*). Generation of manufacturing control instructions based on the manufacturing direction data is discussed in further detail below. The manufacturing control instructions may include travel instructions and deposition instructions for each guide curve provided. Accordingly, one or more guide curves may be provided at the discretion of the structural engineer. The guide curves 210-214 again are provided by way of example only in order to provide context for subsequent disclosures.

The length of a guide curve may impact the time between forming successive layers during the additive manufacturing process. As the guide curve is used to control the toolpath during manufacture, the time between starting successive layers may depend on the length of toolpath the nozzle follows during manufacturing. The duration between starting one layer and beginning a next layer during manufacturing is referred to herein as the "layer time." A shorter toolpath may result in a shorter layer time while a longer toolpath may result in a longer layer time. As noted above, the properties of the build material may limit suitable layer times, e.g., as a result of the build material's rate of curing, cooling, crystallization, hardening, and the like. In this regard, the ability of certain build materials (e.g., thermoplastics, cements) to form suitable bonds between successive layers may depend on beginning a new layer within a suitable timeframe of beginning the previous layer, e.g., before the previous layer cures, cools, crystallizes, hardens, etc., too much. It will thus be appreciated that it may be desirable to indicate guide curves that result in toolpaths that can be completed within an expected layer time.

Figure 6A:
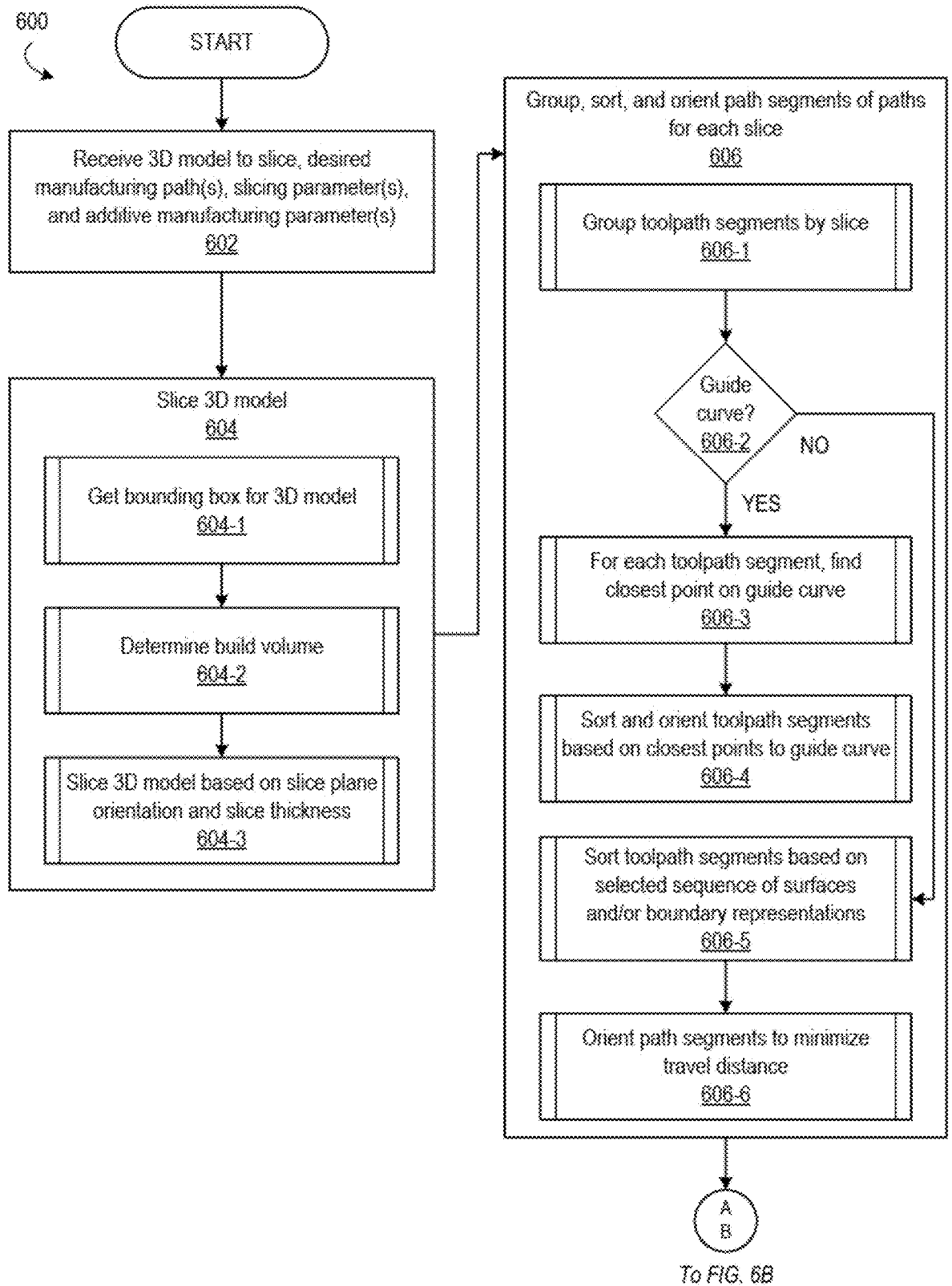
FIGS. 6A-B show another flowchart of example method steps for generating additive manufacturing control instructions in accordance with aspects of the present disclosures.
Figure 6B:
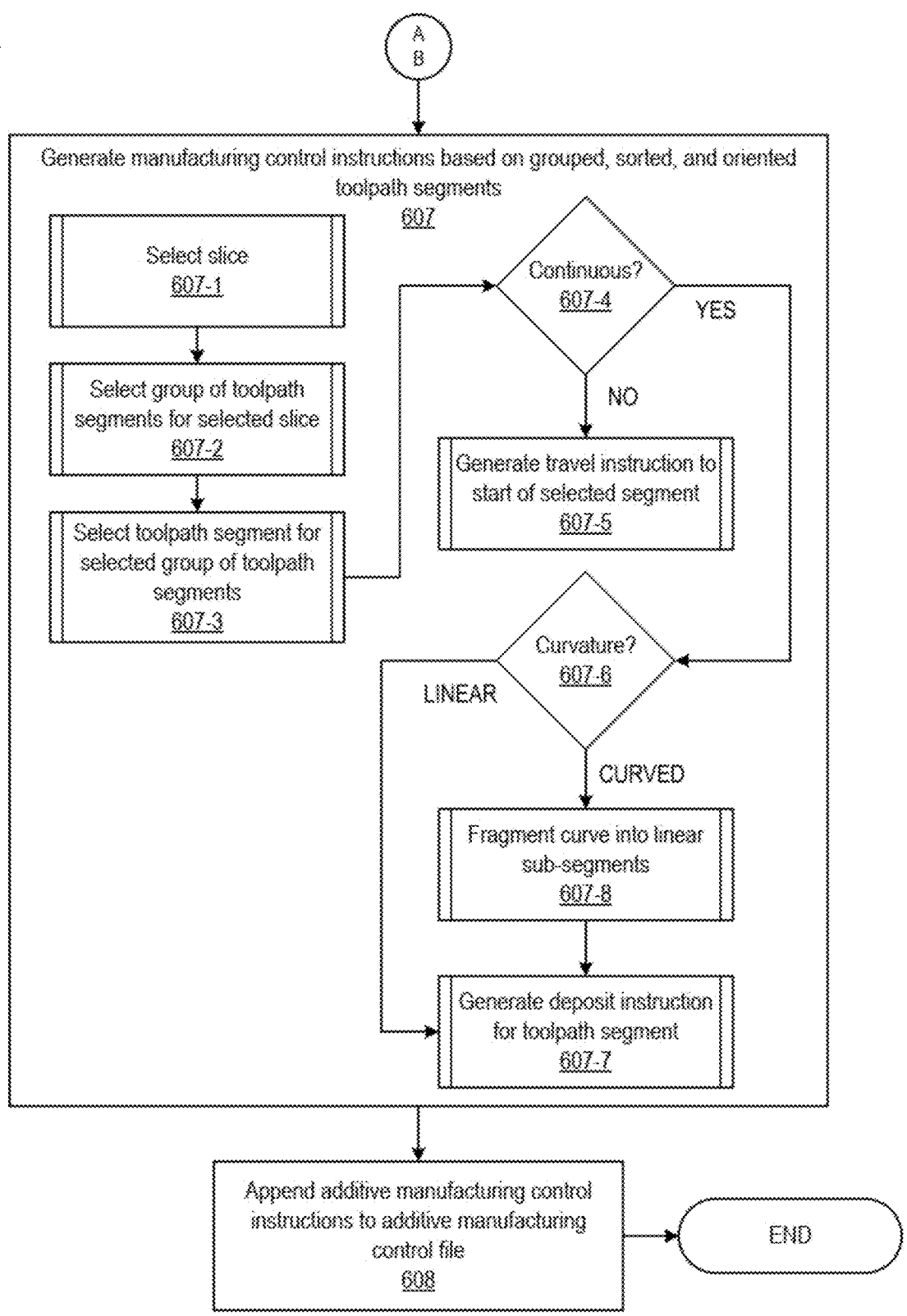

FIG. 2C shows an illustration of the cross-section of the 3D model for the structural component 200 in which the second approach noted above, in this case a sequence of selected surfaces and/or boundary representations, is used to specify the desired manufacturing paths. In this regard, a sequence of selected surfaces and/or boundary representations may be understood as a user-selected ordering of the surfaces and/or boundary representations. One or more guide curves may be determined based on the selected sequence of surfaces and/or the selected sequence of boundary representations. For example, a selected sequence of surfaces and/or boundary representations may be mapped, translated, or otherwise converted to one or more corresponding guide curves. Alternatively, the selected sequence of surface and/or boundary representations itself may be employed when generating the manufacturing toolpaths as discussed in further detail below with reference to FIGS. 6A-B. A default ordering of the surfaces and/or boundary representations may otherwise be indicated by the 3D model itself. e.g., as an ordering of the geometries and objects that define the 3D model.

As seen in FIG. 2C, the cross-section of the 3D model in this example includes surfaces 206*a*-*h* (collectively 206) and boundary representations 208*a*-*e* (collectively 208). To indicate the desired manufacturing path(s), a sequence of surface (s) 206 and/or a sequence of boundary representation(s) 208 may be selected. In FIG. 2C, for example, the sequence numbers indicate an ordered sequence of selected surfaces starts with surface 206*a*, proceeds counterclockwise around the perimeter of the structural component through surfaces 206*b*-*d*, and then across the internal struts across surfaces 206*e*-*f* and 206*g*-*h* to end at surface 206*h*. Again it will be appreciated that the sequence of surfaces selected in FIG. 2C is provided by way of example only and that other sequences of surfaces may be selected as desired. Additionally or alternatively, a sequence of boundary representations may be selected in a similar fashion. In this regard, a guide curve may be determined based on a selected sequence of surfaces, a selected sequence of boundary representations, or a selected sequence of a combination of surfaces and boundary representations.

It should be appreciated that the guide curves and selected sequences used in any particular scenario are at the discretion of the structural engineers based on their knowledge and skill. The example guide curves 210-214 shown in FIG. 2B and the example surface selections shown in FIG. 2C should not be construed as the guide curves or surface selections best suited for additive manufacturing of the example structural component 200. Rather, the present disclosures provide structural engineers with the ability to ensure, to the extent possible, that the component is manufactured in a manner that takes into account some of the same considerations (e.g., expected mechanical stress, build material properties, etc.) that influenced its design and that account for manufacturing requirements (e.g., total mass, warpage, etc.). The ability to specify desired manufacturing paths, therefore, is the point of departure for generating manufacturing control instructions that ultimately control the toolpath during manufacture in accordance with the object's design and manufacturing requirements.

The guide curves and sequence selections may be specified using a CAD tool, e.g., a suitably configured CAD application or other CAD software. For example, guide curves or sequence selections may be specified using the same CAD tool used to design the 3D model for the structural object or a separate CAD tool specifically configured to indicate guide curves or select surfaces and/or boundary representations of the 3D model. For selected sequences of surfaces and/or boundary representations, the CAD tool may also be configured to determine the corresponding guide curves, e.g., by translating, mapping, or otherwise converting those sequence selections into the appropriate guide curves.

Figure 3:
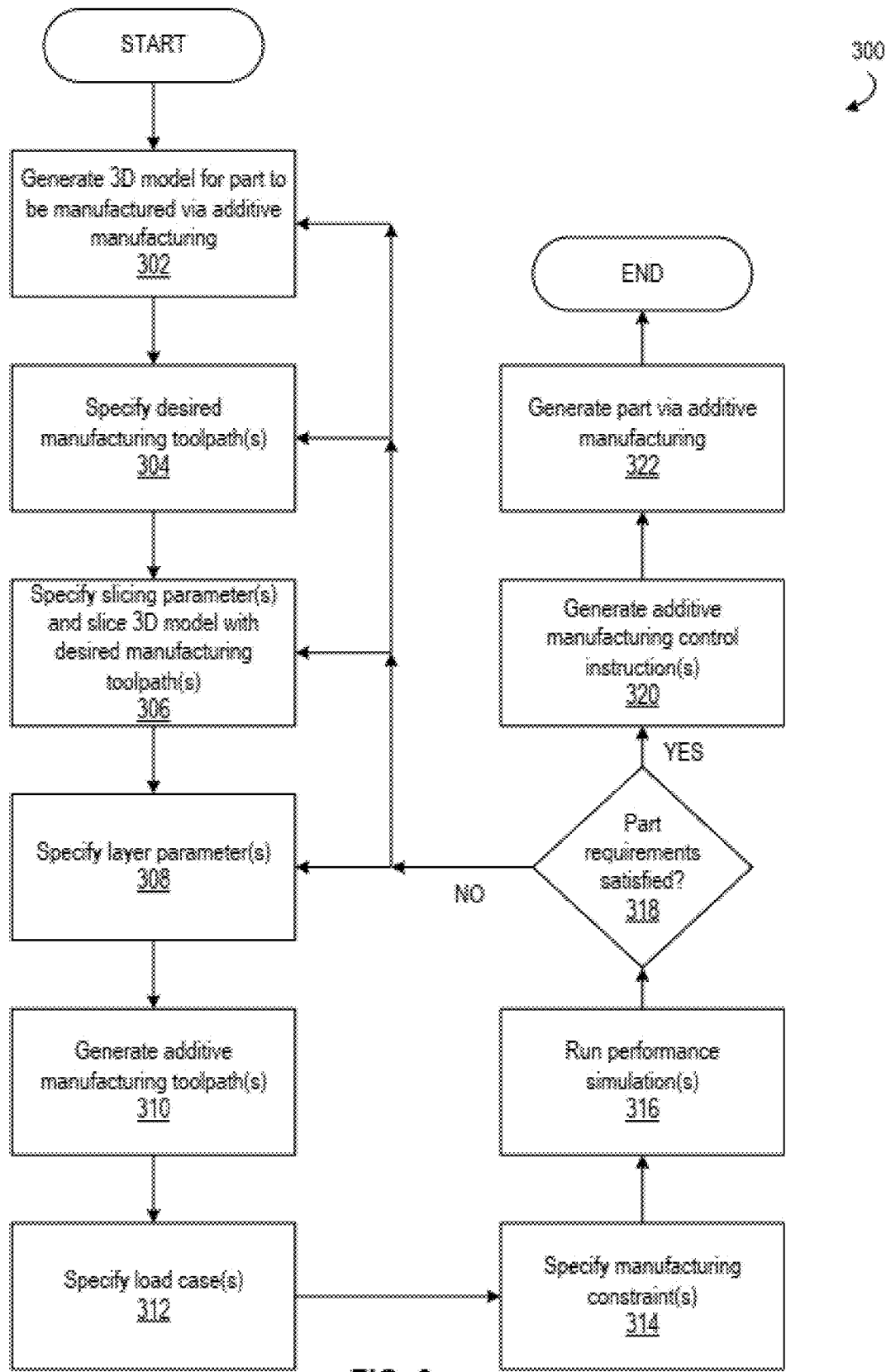
FIG. 3 shows a flowchart of example method steps for designing and manufacturing a part via additive manufacturing in accordance with aspects of the present disclosure.

Turning now to FIG. 3, a flowchart 300 of example method steps for designing and manufacturing a part via additive manufacturing is shown. The example steps shown in FIG. 3 are intended to provide a high-level overview of the design, pre-manufacturing, and manufacturing phases associated with the manufacture of a structural component in accordance with aspects of the present disclosures. Accordingly, the steps shown in FIG. 3 need not be performed in the specific order shown. Additional details regarding the design, pre-manufacturing, and manufacturing phases are discussed below with reference to FIGS. 5 and 6A-B.

To begin, one or more structural engineers may design a part to be manufactured via additive manufacturing and generate a 3D model for that part (S302). As noted above, the part may be a structural component of a load-bearing structure or the load-bearing structure itself. It will be appreciated that any suitable 3D modeling tool (e.g., a 3D modeling software application) known to those having ordinary skill in the art now or in the future may be used to generate the 3D model for the part.

A structural engineer may indicate one or more desired manufacturing paths, referred to herein as "guide curves," that an additive manufacturing apparatus should follow when generating the part via an additive manufacturing process (S304). Multiple guide curves per part may be indicated. Multiple guide curves may be indicated for one or more cross-sections of the 3D model. Such guide curves may be indicated manually, or may be chosen using known software tools which optimize for this purpose.

A structural engineer may specify one or more slicing parameters to slice the 3D model (S306). It will be recognized that slicing the 3D model divides it into one or more layers. The layers may be flat or curved. Each layer may correspond to a cross-section of the 3D model. Slicing parameters include the orientation of the slice plane, referred to herein as the "slice plane orientation," and the thickness of each resulting layer. The 3D model may be sliced with its associated guide curves. Accordingly, the layers of the 3D model may indicate where the guide curves and the geometries (e.g., boundary representations) of the 3D model intersect.

A structural engineer also may specify one or more layer parameters (S308). Here, layer parameters refer to the characteristics of a layer of the part to be manufacturing using an additive manufacturing process. Layer parameters include layer thickness and layer width. Layer thickness here refers to the thickness of each layer of the manufactured part in the build direction (e.g., typically along the z-axis of a part's cross-section defined in the x-y plane). Accordingly, layer thickness may be understood as the physical analog to the distance between slices of the 3D model. Layer width here refers to the width of the toolpath, which is defined by the throughput of the build material (e.g. the filament speed in FFF processes or the screw speed in FGF processes) relative to the speed at which the nozzle traverses the build area. Of course the size of the nozzle of the additive manufacturing apparatus and the resultant diameter of the build material (e.g., filament diameter) is known to influence the throughput. Layer width may correspond to the width of a wall of the part after a single pass of the nozzle in which case the layer width would be approximately the diameter of the build material (e.g., the filament) extruded from the nozzle. A second pass of the nozzle, therefore, may result in a wall with double layer width.

Having specified the guide curves and sliced the 3D model, one or more additive manufacturing paths may be generated (S310). Here, the generated additive manufacturing toolpaths refer to those that will be used, in turn, to generate the corresponding manufacturing control instructions for the additive manufacturing apparatus. As described in further detail below with reference to FIGS. 5 and 6A-B, the generated manufacturing paths are processed (e.g., group, oriented, etc.) prior to generating the corresponding manufacturing control instructions that control the toolpaths of the additive manufacturing apparatus to follow the indicated guide curves. As described in further detail below with reference to FIGS. 4 and 5, a toolpath generator may be used to generate the additive manufacturing toolpaths based on the slices of the 3D model and the guide curves.

A structural engineer may run one or more performance simulations in order to optimize the design of the part, the desired manufacturing paths, the slicing parameters, and/or the layer parameters. Such optimization may involve iteratively running performance simulations on the part's 3D model along with its specified guide curves and slicing, layer parameters, material property characteristics, and/or mechanical material parameters (such as stiffness, strength, etc.). The performance simulations may evaluate both the part's performance in response to one or more simulated loads as well as any constraints imposed on manufacturing the part. In this regard, one or more load cases may be specified (S312), one or more manufacturing constraints may be specified (S314), and one or more performance simulations may be run (S316) based on the specified load cases and/or manufacturing constraints. Load cases may specify one or more load conditions. Load conditions may include static and/or dynamic loads. Manufacturing constraints may include, for example, physical properties of the part such as total mass, stiffness, strength, warpage, shrinkage, and the like. Manufacturing constraints may also include constraints relating to the additive manufacturing toolpaths and are discussed in further detail below.

The specified load cases and manufacturing constraints may be referred to as the part requirements, that is the requirements a proposed design must satisfy to be considered "successful" in view of the specified load cases and/or manufacturing constraints. A proposed design may include the 3D model for the part along with its specified guide curves, slicing parameters, and layer parameters. If, for example, a proposed design passes a specified load case, then the part may be deemed to be "successful." In some cases, a proposed design may need to pass all specified load cases to be deemed "successful." Similarly, if a proposed design satisfies a specified manufacturing constraint, then the proposed design may be deemed "successful." Satisfying a specified manufacturing constraint (e.g., total mass, warpage) may include satisfying a specified threshold (e.g., satisfying a total mass threshold, satisfying a warpage threshold). Again, in some cases, a proposed design may need to satisfy all specified manufacturing constraints to be considered "successful."

If the part requirements are satisfied (S318: YES), then manufacturing control instructions may be generated (S320) using the additive manufacturing toolpaths that were generated based on the slices of the 3D model and their associated guide curves. Those manufacturing control instructions then may be provided to an additive manufacturing apparatus to manufacture the part using an additive manufacturing process (S322). If, however, the part requirements are not satisfied (S318: NO), then the proposed design may be modified. Modifying a proposed design may include a total redesign of the part and generation of a new 3D model for the redesigned part or modifying the existing 3D model for the part (S302), specifying new guide curves or modifying existing guide curves (S304), modifying the slicing parameters (S306) such as by specifying a new slice plane orientation and/or layer thickness, modifying the layer parameters (S308) such as by specifying a new layer thickness or layer width), and/or regenerating the additive manufacturing toolpaths (310).

As noted above, various manufacturing constraints may be related to the guide curves and their corresponding manufacturing toolpaths. As also noted above, for some parts, it may be desirable to ensure the manufacturing toolpath is continuous during manufacture. Accordingly, the manufacturing constraints may include a continuous guide curve constraint that indicates whether a continuous guide curve is required. A proposed design may be modified if continuous guide curves are not possible given a specified slicing plane orientation (e.g., modifying the guide curves and/or slice plane orientation). As further noted above, it may be desirable to ensure successive layers are completed within a certain layer time. Accordingly, the manufacturing constraints may include a layer time constraint that indicates a required layer time. A proposed design may be modified if the layers cannot be formed within the specified layer time (e.g., modifying the guide curves). Additional examples of manufacturing constraints relating to the guide curves include: whether it is permissible for the manufacturing toolpath to repeat segments of the manufacturing toolpath or if repeated segments must be avoided; whether it is permissible for the manufacturing toolpath to cross over itself or if toolpath crossings must be avoided; and, if toolpath crossings are permitted, a threshold number of permissible toolpath crossings (e.g., no more than x toolpath crossings). In general, some manufacturing constraints, including some of those listed above, may be configurable to indicate their conditions are required, not required, desirable, permissible, optional, and the like. The manufacturing constraints may include any combination of manufacturing constraints including those discussed above.

It should be appreciated that modifications to a proposed design will be at the discretion of the structural engineer as informed by the outcome of the performance simulations and based on their knowledge and skill. It should also be appreciated that a proposed design may involve mutual dependencies between aspects of the design, e.g., the geometries of the 3D model, the slicing parameters, and the guide curves. For example, a given slicing orientation may prevent continuous guide curves (e.g., due to interference from other surfaces that result from the slicing orientation). If continuous (e.g., unbroken, uninterrupted) guide curves are desirable or required, then a new slicing plane orientation and/or a new guide curve may be specified. Alternatively, as described in further detail below, the system used to generate the manufacturing toolpaths may be configured to solve for continuous manufacturing toolpaths when a given slicing orientation interrupts a continuous guide curve. As another example, if a specified guide curve results in a toolpath that cannot be completed within a desirable or required layer time, then a new guide curve may be specified. Alternatively, as also described in further detail below, the system used to generate the manufacturing toolpaths may be configured to solve for manufacturing toolpaths that can be completed within a desired layer time (e.g., the shortest possible toolpath). It will be recognized that the slicing plane may also affect the orientation of the fibers in a fiber-based build material which, in turn may affect the performance of the part. Accordingly, as a further example, if a specified slicing plane orientation would result in the fibers of the build material lying along an undesirable direction (e.g., not along the build direction), then a new slicing plane orientation may be specified. In some cases, a redesign of the part as a whole or an aspect of the part along with its corresponding 3D model may be warranted.

The design and pre-manufacturing phases thus may be an iterative processes whereby the performance simulations are used to optimize a proposed design for specified load cases and manufacturing constraints. While the example steps in FIG. 3 present this iterative process as a design-evaluate-redesign methodology, this need not always be the case. For example, in one alternative methodology, performance evaluations may first be run on the 3D model for a proposed design. Based on the performance evaluations, the part may be redesigned as needed to optimize it for any desired requirements, e.g., stiffness, strength, etc. After optimizing the design of the part, one or more guide curves may be specified for the optimized part design. It will be appreciated that the performance evaluations may inform the design of the guide curve. For example, the performance evaluations may indicate where the part is expected to experience relatively more stress, and the guide curves may be designed to ensure sufficient strength between the layers at those areas.

Other alternative methodologies may be employed to identify optimal slicing parameters or guide curves. For example, multiple potential slice plane orientations (or layer thicknesses) may be specified, and performance evaluations may be run for each potential slice plane orientation. The performance evaluations may identify those potential slice plane orientations that satisfy the part requirements. The slice plane orientation to use for slicing the part (e.g., the optimal slice plane orientation) may be selected from those that satisfy the part requirements. Similarly, multiple potential guide curves may be specified, and performance evaluations may be run for each potential guide curve. The performance evaluations similarly may identify those potential guide curves that satisfy the part requirements. The guide curve to use for generating the corresponding manufacturing control instructions (e.g., the optimal guide curve) may be selected from those that satisfy the part requirements. The performance evaluations for the potential slice plane orientations or potential guide curves may be run sequentially or in parallel for the sake of efficiency. These alternative methodologies may be employed for optimized part designs as described above or initial part designs without the benefit of optimization.

Figure 4:
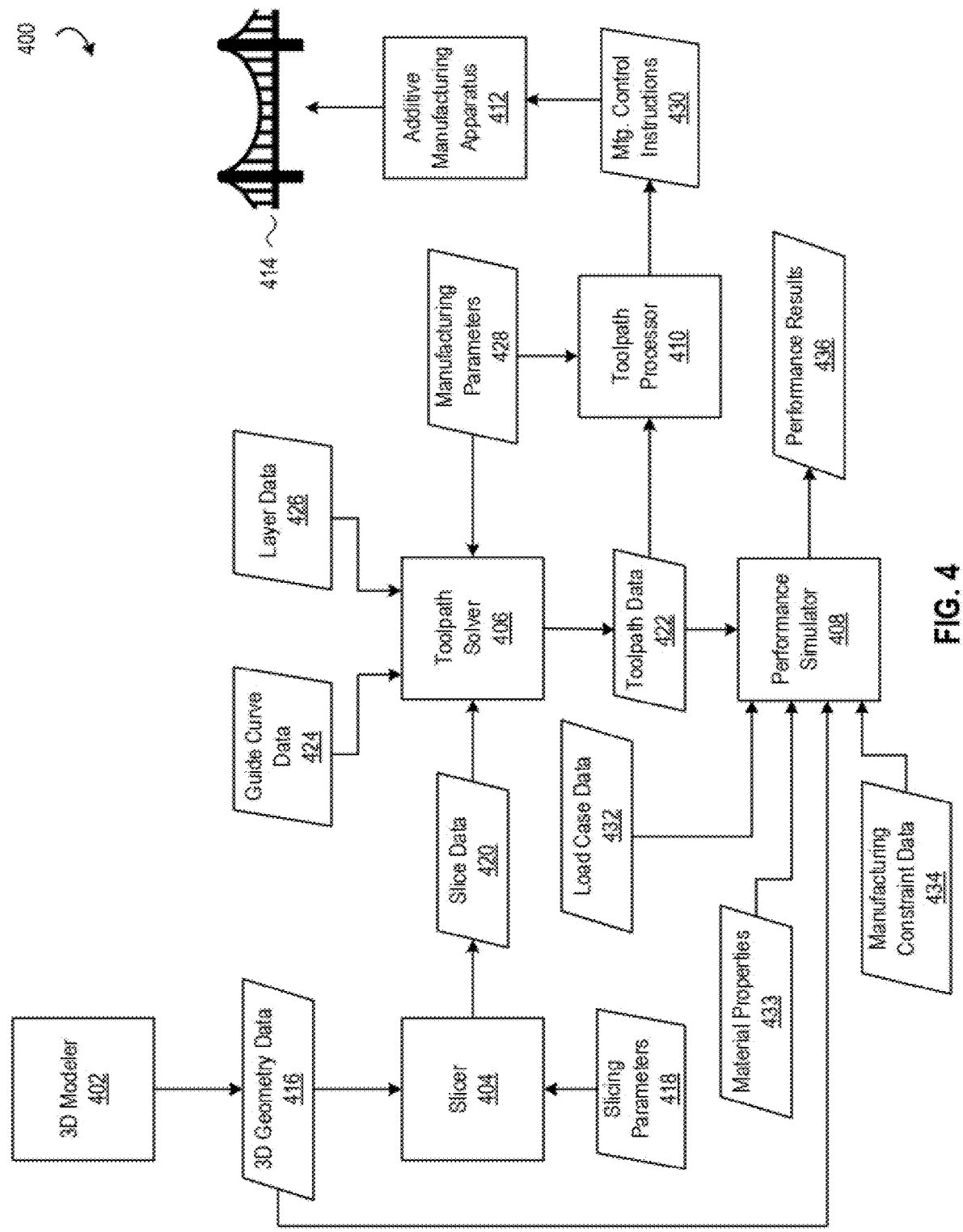
FIG. 4 shows a block diagram of an example additive manufacturing system in accordance with aspects of the present disclosures.

Referring now to FIG. 4, a block diagram of an example additive manufacturing system 400 is shown. The additive manufacturing system 400 may be used to perform at least some of the steps described with reference to FIG. 3 above and FIGS. 5 and 6A-B below. The additive manufacturing system 400, in this example, includes a sequence of processes to model a structural component's design and optionally simulate its performance, slice the model, generate manufacturing toolpaths based on the sliced model, and generate corresponding manufacturing control instructions based on the generated manufacturing toolpaths. The manufacturing control instructions may then be used to manufacture the structural component (also referred to herein as the part) via an additive manufacturing process. Accordingly, FIG. 4 illustrates the logical components associated with these processes including a 3D modeler 402, a slicer 404, a toolpath solver 406, a performance simulator 408, and toolpath processor 410. FIG. 4 also includes an additive manufacturing apparatus 412 used to manufacture the structural component 414 via an additive manufacturing process. The structural component 414, in this example, is a bridge.

The logical components illustrated in FIG. 4 may be embodied in computer-usable or readable data and/or computer-executable instructions, such as in one or more software applications, programs, program modules, scripts, services, and the like, that are executed by one or more computers or other devices as described herein. Generally, software applications, programs, program modules, scripts, services, etc., include logic, functions, routines, components, data structures, etc. that perform particular tasks or implement particular abstract data types when executed by one or more processors in a computer, computing system, or other device. The logic, functions, routines, components, data structures, etc. may be written in a source code programming language that is subsequently complied for execution such as assembly, C, C++, JAVA, Python. Matlab, and the like, or may be written in a scripting language such as, e.g., HTML, XML, JavaScript, and the like. The executable instructions may be stored on a computer-readable medium such as a hard disk, optical disk, removable storage media, solid state memory, RAM, ROM, etc. The functionality of the software applications, programs, program modules, scripts, services, etc. may be combined or distributed as desired in various implementations, e.g., residing on a single computing device or distributed across multiple computing devices connected to each other either directly or via one or more networks including local area networks and wide area networks. In addition, the functionality may be embodied in whole or in part in firmware or hardware equivalents such as application-specific integrated circuits (ASICs), field programmable gate arrays (FPGAs), complex programmable logic devices (CPLDs), and the like. Various data structures may be used to more effectively implement one or more aspects of the disclosures herein, and such data structures are contemplated to be within the scope of the executable instructions and computer-usable data described herein.

As described in further detail below, the example additive manufacturing system 400 shown in FIG. 4 may be employed to design a structural component to be manufactured via the additive manufacturing apparatus 412. The slicer 404 generates the slices of the structural components 3D model to identify where a slicing plane intersects the geometries of the 3D model. Those intersections define the boundaries of the layers formed during the additive manufacturing process. The layers are associated with guide curves used to control the manufacturing toolpaths used to form the layers. The toolpath solver 406, in this example, is configured to resolve the manufacturing toolpaths (e.g., solve for, identify, determine, generate, etc.) based, for example, on the desired manufacturing paths associated with the layers (e.g., guide curves, sequence of selected surfaces and/or boundary representations), the results of the slicing procedure, and the manufacturing parameters. The toolpath processor 410 then processes the resolved manufacturing toolpaths to generate the manufacturing control instructions for the additive manufacturing apparatus 412. The manufacturing control instructions, therefore, may thus be described as being based on the resolved manufacturing toolpaths. The additive manufacturing apparatus 412 then manufactures the structural component 414 using those manufacturing control instructions. The structural component 414, in this example, is a bridge.

Optionally, as described above, the performance simulator 408 may simulate and evaluate the performance of the structural object manufactured according to the generated toolpaths within specified load cases and manufacturing constraints. Depending on the outcome of those performance simulations, a user may redesign the structural component in part or in whole, modify the slicing parameters, modify the desired manufacturing paths, and the like, until specified manufacturing requirements are satisfied as described above with reference to FIG. 3.

The 3D modeler 402f may be implemented in any suitable CAD system configured to create a 3D model of a part to be manufactured via additive manufacturing. The 3D modeler 402 may provide (e.g., output) 3D geometry data 416, e.g., in the form a 3D model. The 3D geometry data 416 may define the 3D geometries of a part including the contours of its surfaces, its boundaries, and its volume. These 3D geometries of a part may be referred to collectively as the part's topology. Any suitable file format may be employed to provide the 3D geometry data, e.g., an STL file, 3MF file, or AMF file.

The slicer 404 may be implemented in any suitable slicing tool configured to slice a 3D model into multiple slices. The slices of the 3D model, or more precisely the distance between successive slices of a 3D model, correspond to the physical layers of the structure object successively formed (e.g., printed) by the additive manufacturing apparatus 412. A layer may be understood as a cross-section of the 3D model having a certain thickness, the dimensions of which are bound by the distance between two slices. A slice may be a flat plane (e.g., corresponding to an x-y plane of the 3D model), or a slice may be a curved surface that follows the contours of the 3D model. To slice the 3D model, a slicing plane may be specified. For a flat slice plane, a slicing plane orientation may be specified (e.g., x°). For a curved slice surface, the slice plane orientation may correspond to the curve of a surface of the part or may be specified using a suitable formula or equation for a desired curve. The thickness of a layer (i.e. the distance between successive slices) may be fixed or vary, such as in the case where a constant number of slices is produced over the thickness of a complete wall with varying thickness. Accordingly, the slicer 404 may accept slicing parameters 418 as input to the slicing procedure. The slicing parameters 418 may include one or more slice plane orientations and one or more layer thicknesses. It will be appreciated that additive manufacturing processes that employ an oblique slice plane orientation (e.g., 45°) may shorten the manufacturing toolpath for a layer of the part which, in turn, may advantageously reduce the amount of time needed to complete a single layer during manufacture. Using an oblique slice plane orientation, therefore, may be advantageous for relatively longer parts where relatively shorter layer times are needed to ensure sufficient bonding between successive layers.

The slicer 404 may provide slice data 420 as output. The slice data 420 may indicate, for example, the individual slices of the 3D model resulting from the slicing procedure and the corresponding manufacturing toolpath segments that result from the intersection of the slice plane with the geometries (e.g., boundary representations) of the 3D model. The manufacturing toolpath segments may include lines, polylines, and curves. A manufacturing toolpath segment thus corresponds to a line or curve of the ultimate manufacturing toolpath that deposits the build material to form a layer of the part that corresponds to a slice of its 3D model.

The toolpath solver 406, in this example, is configured to resolve the manufacturing toolpaths ultimately used to generate the manufacturing control instructions provided to the additive manufacturing apparatus 412. In this regard, the toolpath solver 406, in this example, is configured to generate the toolpath data 422 characterizing the resolved manufacturing toolpaths. The toolpath solver 406, in this example, is configured to resolve the manufacturing toolpaths based on the slice data 420, guide curve data 424, layer data 426, and manufacturing parameters 428.

The guide curve data 424 may indicate the desired manufacturing paths as described above with reference to FIGS. 2B-C. As described above, the guide curves indicated in the guide curve data 424 may be indicated (e.g., generated, specified, defined, etc.) in different ways. As noted above, one way of indicating a guide curve includes indicating a directed line on a cross-section of the 3D model. The directed line may be straight or curved and have a starting point and ending point. In this way, a guide curve may approximate a shape of the cross-section of the 3D model. The guide curve may approximate the entire shape of the cross-section or only a portion of the shape of the cross-section. The guide curve data 424 may be stored and associated with the 3D model. The 3D model, in some examples, may include the guide curve data 424 itself. As also described above, another way of indicating a guide curve includes selecting one or more surface and/or boundary representations of the 3D model. The guide curve data 424 may thus indicate the sequence of the selections of the surface and/or boundary representations and their respective order in the sequence (e.g., first, second, etc.). Additionally or alternatively, selections may be used to generate a directed line corresponding to a guide curve. The guide curve data 424 may also indicate the 3D model and any particular cross-section a guide curve is associated with.

The guide curves may be indicated using any suitable tool configured to indicate a guide curve relative to a cross-section of the 3D model. This may include, for example, a tool configured to allow a user to draw a directed line on a cross-section of the 3D model, select a sequence of surfaces and/or boundary representations of the 3D model, or generate a guide curve based on a selected sequence of surfaces and/or boundary representations. The tool used to indicate a guide curve for a 3D model may be a component of the 3D modeler (e.g., as a feature, add-on, or plug-in) or may be a separate tool (e.g., a standalone software application, program, script, or the like).

The layer data 426 may indicate desired properties of one or more layers of the part to be manufactured. The layer data 426 may indicate, for example, layer width, layer time, and the like.

The manufacturing parameters 428 may indicate aspects of the additive manufacturing process relating to the additive manufacturing apparatus 412 and the manufacturing environment. Examples of manufacturing parameters include specifications of the additive manufacturing apparatus 412, e.g., printer volume, nozzle diameter, filament diameter, filament retraction (e.g., to prevent "oozing"), extrusion type (e.g., relative, absolute), and head orientation (e.g., straight, perpendicular, rotated), travel speed (e.g., in the x-, y-, and z-directions relative to the slicing plane), deposition speed (e.g., speed of nozzle when depositing build material), and the like. Other manufacturing parameters, such as those used in a FGF process, might include printer volume, nozzle diameter, material screw speed, extruder (barrel) diameter, head orientation, travel speed, deposition speed, and the like. Still further examples of manufacturing parameters 428 also include properties of the manufacturing environment, e.g., nozzle temperature, bed temperature. Some of the manufacturing parameters may be configurable settings of the additive manufacturing apparatus 412, e.g., travel speed, deposition speed, filament retraction, nozzle temperature, bed temperature, and optionally print chamber temperature.

A resolved manufacturing toolpath may include multiple toolpath segments. The toolpath data 422 generated by the toolpath solver 406, in this example, indicates the grouping, sorting, and orientation of the toolpath segments. The toolpath solver 406, in this example, is configured to group, sort, and orient the toolpath segments according to their associated slices and desired manufacturing paths. Rather than grouping the toolpath segments by the surfaces and/or boundary representations they are associated with, the toolpath solver 406, in this example, is configured to group the toolpath segments according to the slices of the 3D model which correspond to the layers of the part. The toolpath solver 406, in this example, is also configured to sort and orient the toolpath segments based on any associated guide curve or any associated sequence of selected surfaces and/or boundary representations. The toolpath data 422 may thus indicate the grouping, sorting, and orientation of the respective toolpath segments for the slices of the 3D model. Generating the toolpath data 422 is discussed in further detail below with reference to FIGS. 6A-B.

Resolving a manufacturing toolpath may include ensuring the manufacturing toolpath continuously prints or deposits material across a slice of the 3D model. In this regard, the toolpath solver 406 may enforce a manufacturing constraint of continuous manufacturing toolpaths. It will be recognized that a given slice of the 3D model may include multiple surfaces and/or boundary representations of the 3D model and the particular surfaces and/or boundary representations associated with a given slice may depend on the particular slice plane orientation used to slice the 3D model. For example, a slice plane orientation of 0° (e.g., perpendicular to the direction of manufacture) may result in a slice associated with one group of surfaces and/or boundary representations (e.g., surfaces and/or boundary representations corresponding to a single layer of the part), while a slice plane orientation of 45° (e.g., oblique relative to the direction of manufacture) may result in a slice associated with a different group of surfaces and/or boundary representations (e.g., surfaces and/or boundary representations corresponding to multiple layers of the part). Where a selected sequence of surfaces and/or boundary representations are used to indicate the desired manufacturing path, slicing the 3D model may introduce intermediate surfaces and/or boundary representations that are not included in the selected sequence of surfaces and/or boundary representations. In view of this, to ensure a continuous manufacturing toolpath (i.e. to ensure the toolpath continuously deposits material), the toolpath solver 406, in this example, is configured to identify any intervening surfaces and/or boundary representations to include in the sequence of surfaces and/or boundary representations along with their proper position in the sequence. In the event a continuous manufacturing toolpath is not possible given the intervening surfaces and/or boundary representations that result from a given slice plane orientation, the toolpath solver 406 may be configured to provide an indication that a continuation manufacturing toolpath is not possible. The toolpath solver 406 may also provide an option to continue resolving the manufacturing toolpaths using multiple non-continuous toolpaths (i.e. a toolpath that does not continuously deposit material) if desired. Otherwise, a user may re-slice the 3D model with a different slice plane orientation that allows for continuous manufacturing toolpaths. The toolpath solver 406 may also be configured to otherwise determine a continuous manufacturing toolpath across the topology of a slice of the 3D model in accordance with an associated guide curve.

Resolving a manufacturing toolpath may also include ensuring a manufacturing toolpath can be completed within a desired timeframe. For example, as discussed above, it may be desirable to ensure a manufacturing toolpath can be completed within a desired layer time to ensure a sufficient bonding between successive layers of the part during manufacture. In this regard, the toolpath solver 406 may enforce a manufacturing constraint of a required layer time. It will be appreciated that the ability to complete a manufacturing toolpath within a desired timeframe may depend on the capabilities and settings of the additive manufacturing apparatus. The manufacturing parameters 428 may include those capabilities and settings (e.g., layer width and height; manufacturing speeds in the x-, y-, and z-directions; extrusion rate; temperature; etc.). The toolpath solver 406, therefore, may be configured to identify multiple potential manufacturing toolpaths, evaluate the time needed to complete each of them, and select one to use for manufacture of the part based on the desired layer time and any specified manufacturing parameters. The manufacturing toolpath selected may be that which is associated with the shortest manufacturing time (e.g., the shortest potential manufacturing toolpath). Alternatively, the manufacturing toolpath selected may be any that satisfies a threshold manufacturing time (e.g., a desired layer time). The toolpath solver 406 may be configured to employ additional and alternative criteria to identify a manufacturing toolpath (e.g., the shortest continuous manufacturing toolpath that satisfies a threshold layer time). In this regard, resolving a manufacturing toolpath may include simply ensuring a manufacturing toolpath is the shortest manufacturing toolpath of those available.

In another embodiment, the toolpath solver 406 may be configured to employ criteria including stored material property characteristics which are associated with a build material to be used in order to identify a manufacturing toolpath which minimizes or utilizes an object's estimated anisotropic properties. Specifically, a stored material property characteristic may include a fusion characteristic, which defines one or more aspects of the readiness of a particular material composition in one location to fuse to another location for a given set of ambient conditions, such as temperature. Non-limiting examples of fusion characteristics include crystallization rate and crystallization temperature. Using this stored material property characteristic, a desired layer time can be readily derived which determines the maximum amount of time that may pass before a previously-deposited layer has crystallized or cooled too significantly (which itself may be a user-specified value, included as part of the fusion characteristic, or another stored material property characteristic altogether) to allow for sufficient adhesion to a subsequently deposited layer at any point or region. In this way, the toolpath solver 406 may propose manufacturing toolpaths which result in a layer duration which is less than or equal to a desired layer time. Alternatively, the toolpath solver 406 may propose manufacturing toolpaths which can facilitate the determination (either by a user or by the system) as to whether a specified desired manufacturing path sufficiently meets relevant manufacturing constraints.

The toolpath solver 406, in this example, may also be configured to orient the toolpath segments associated with a given layer of the part according to different criteria. For example, where the toolpath segments of a layer are not associated with any guide curve but rather a selected sequence of surfaces and/or boundary representations, the toolpath solver 406 may orient them based on that selected sequence (e.g., an orientation that minimizes the travel distance of the nozzle during manufacture). Where the toolpath segments of a layer are associated with a guide curve, the toolpath solver 406 may orient them based on their proximity to the guide curve. Orienting the segments is discussed in further detail below with reference to FIGS. 6A-B. Having grouped, sorted, and oriented the toolpath segments for the identified manufacturing toolpaths, the toolpath data 422 may be provided to the toolpath processor 410 in order to generate the corresponding manufacturing control instructions 430 for the additive manufacturing apparatus 412.

The toolpath processor 410, in this example, is configured to generate the manufacturing control instructions 430 based on the toolpath data 422 generated by the toolpath solver 406. The generation of the manufacturing control instructions 430 is described in further detail below with reference to FIGS. 6A-B. By way of general introduction, the toolpath processor 410 iterates over the grouped, sorted, and oriented toolpath segments to generate, for each toolpath segment, one or more manufacturing control instructions corresponding to the segment. The particular manufacturing control instructions generated for a given segment may depend on whether it is continuous with a previous segment and depend on whether the segment is straight or curved.

The manufacturing control instructions 430 may be any suitable instructions that control the operation of the additive manufacturing apparatus 412. For example, the manufacturing control instructions 430 may include computer numerical control (CNC) instructions such as G-code. Accordingly, the manufacturing control instructions 430 may include, for example, instructions to rotate the nozzle ("rotation instruction"), travel to a new position ("travel instruction"), and deposit material along a specified path ("deposition instruction" or "print instruction"). The manufacturing control instructions 430 then may be provided to the additive manufacturing apparatus 412 to manufacture the structural component 414 in accordance with those instructions.

As noted above, the performance simulator 408 may optionally evaluate the performance of a 3D model with respect to load cases, manufacturing constraints, and/or the toolpaths generated for the 3D model. In this regard, the performance simulator 408 may be configured to accept as input the 3D geometry data 416, load case data 432, manufacturing constraint data 434, and/or toolpath data 422. The load case data 432 may include any of the load case information discussed above, e.g., data characterizing various forces or mechanical stress expected to act upon the structural object. The manufacturing constraint data 434 may include any of the mechanical constraints discussed above, e.g., constraints relating to the properties of the structural object itself (total mass, stiffness, warpage, etc.) as well as constraints relating to the guide curves (continuous, crossings, etc.). The performance simulation, in this example, may be configured to output performance results 436 based on the performance simulations run. The performance results 436 may indicate, for example, whether the structural component satisfies the specified load cases and manufacturing constraints. The performance simulator 408 may be implemented in any suitable performance simulator configured to simulate the performance of a 3D model under specified load cases, manufacturing constraints, and manufacturing toolpaths. Examples of suitable performance simulators include FEA software tools known and used in engineering, such as Abaqus (Simulia), ANSYS, and MARC (MSC software). When advanced material models are needed that are coupled to process-specific models, add-on user subroutines from Digimat (MSC Software) may also be employed. As described above, one or more of the 3D model, the desired manufacturing paths, and/or the slicing parameters (e.g., slice orientation, layer thickness) may be modified based on the results of the performance simulations.

Figure 5:
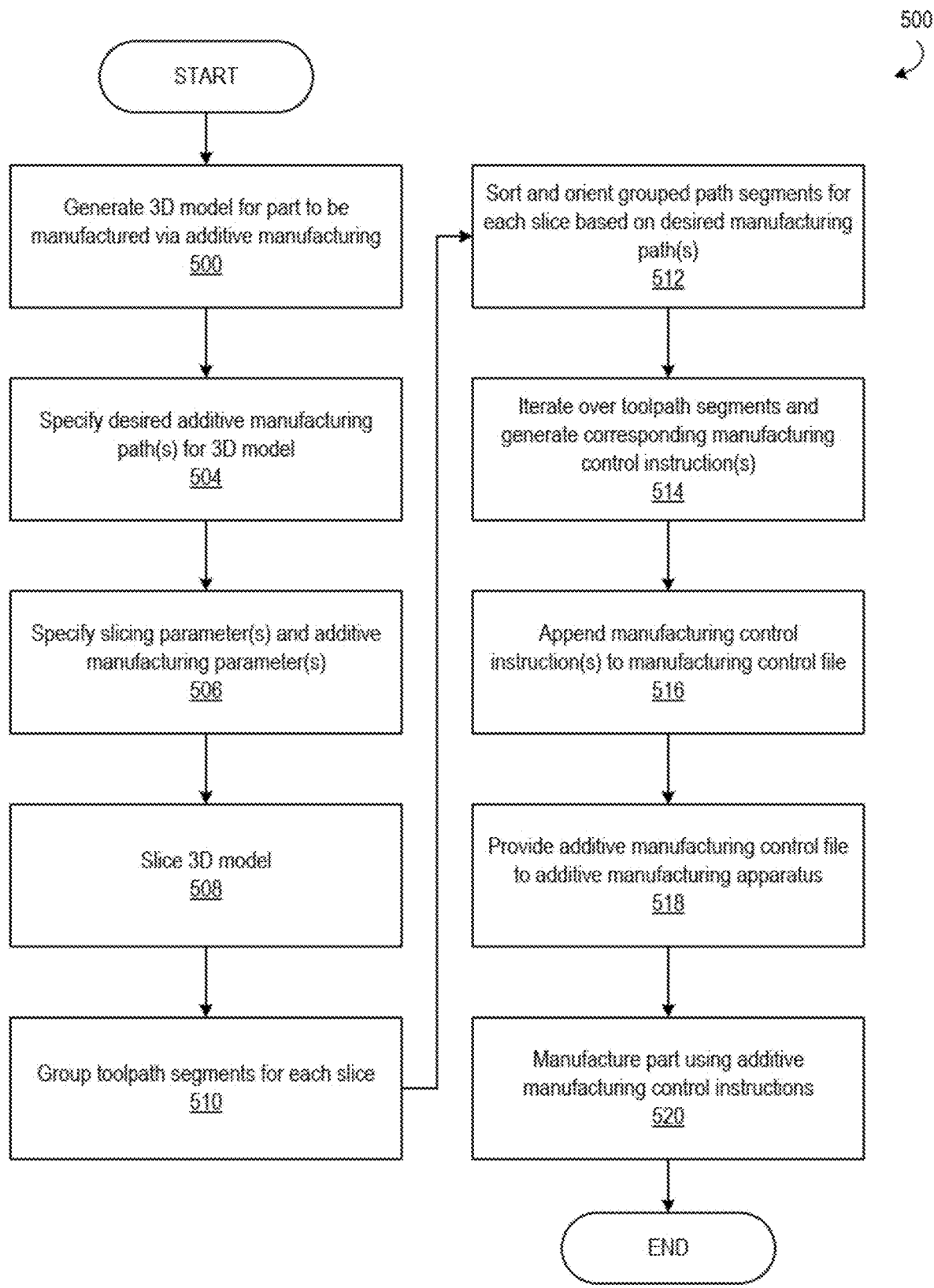
FIG. 5 shows a flowchart of example method steps for generating additive manufacturing control instructions in accordance with aspects of the present disclosures.

Turning now to FIG. 5, a flowchart 500 of example methods steps for generating additive manufacturing control instructions is shown. The example steps shown in FIG. 5 provide a high-level overview of an example approach to generating the additive manufacturing control instructions. A more detailed discussion of certain aspects are discussed below with reference to FIGS. 6A-B.

As described above, the process may begin with generating a 3D model for a part to be manufactured via an additive manufacturing process (S502). One or more desired manufacturing paths (e.g., guide curves) may be specified for the 3D model (S504). One or more slicing parameters and one or more additive manufacturing parameters may be specified (S506). The 3D model may be sliced (S508), and the resulting toolpath segments may be grouped according to the respective slice each is associated with (S510). The grouped toolpath segments may then be sorted and orientated according to the desired manufacturing path (S512). For each toolpath segment in the resulting grouped, sorted, and oriented toolpath segments, one or more corresponding manufacturing control instruction(s) may be generated (S514). Each manufacturing control instruction generated may be appended to a manufacturing control file. (S516). The manufacturing control file may be provided (e.g., sent, saved to, uploaded to) an additive manufacturing control apparatus (S518). The manufacturing control apparatus may then manufacture the part using the manufacturing control instructions (S520).

Referring now to FIG. 6, a flowchart 600 of example method steps for generating additive manufacturing control instructions is shown. As described above with reference to FIG. 5, the process may begin by receiving a 3D model of a part to be manufactured, the desired manufacturing path (s), the slicing parameter(s), and the additive manufacturing parameter(s) (S602). The 3D model may be received from a 3D modeler (e.g., 3D modeler 402 of FIG. 4).

Next, the 3D model may be sliced (S604). A slicer (e.g., slicer 404 of FIG. 4) may slice the 3D model. Slicing the 3D model may include determining the bounding box for the 3D model (S604-1) and the corresponding build volume for the additive manufacturing apparatus (S604-2). The build volume is based on the physical limitations of the additive manufacturing apparatus (e.g., the maximum distances the nozzle can travel in the x-, y-, and z-directions). The bounding box determined for the 3D model places its topology within the build volume of the additive manufacturing apparatus. As described above, the 3D model may be sliced according to the specified slicing parameters including the slice plane orientation and layer thickness (S604-3).

The toolpath segments resulting from the slicing procedure may then be grouped, sorted, and oriented (S606). A toolpath solver (e.g., toolpath solver 406 of FIG. 4) may group, sort, and orient the toolpath segments. One or more of the sub-steps shown in FIG. 6A for step S606 may be repeated for multiple slices of the 3D model (e.g., S606-2 through 606-6). As discussed above, the distance between two slices corresponds to a physical layer of the part to be manufactured. Accordingly, each toolpath segment corresponds to a physical segment of the manufacturing toolpath ultimately used to manufacture the part. The toolpath segments resulting from the slicing procedure, therefore, are grouped by slice (S606-1). A group of toolpath segments thus correspond to a group of physical segments of a corresponding physical manufacturing toolpath. The group of toolpath segments, therefore, may collectively correspond to a manufacturing toolpath for at least a portion of a layer of the part.

The sorting and orientation of the toolpath segments may depend on whether the segment is associated with a specified guide curve or a selected sequence of surfaces and/or boundary representations. If a group of toolpath segments are associated with a guide curve (606-2: YES), then the point on the guide curve that is closest to the toolpath segment may be determined for each toolpath segment (606-3). For example, the point on the guide curve that is closest to the center of the toolpath segment may be determined. The group of toolpath segments associated with the slice are then sorted and orientated based on those determined points on the guide curve (S606-4). The group of toolpath segments may be sorted based on the distance of each point along the guide curve, e.g., from the beginning of the guide curve. For example, the toolpath segment associated with a point on the guide curve that is closest to the beginning of the guide curve may be the first toolpath segment in the sorted group of toolpath segments, and the toolpath segment associated with a point on the guide curve that is closest to the end of the guide curve may be the last toolpath segment in the sorted group of toolpath segments. The intermediate toolpath segments may be sorted in a similar fashion, e.g., the second toolpath segment in the sorted group of toolpath segments may be associated with the second closest point to the beginning of the guide curve and so forth. The group of toolpath segments may be oriented based on a line that is tangential to the guide curve at the point closest to the toolpath segment and that is in the same direction of the guide curve at that point.

Figure 7:
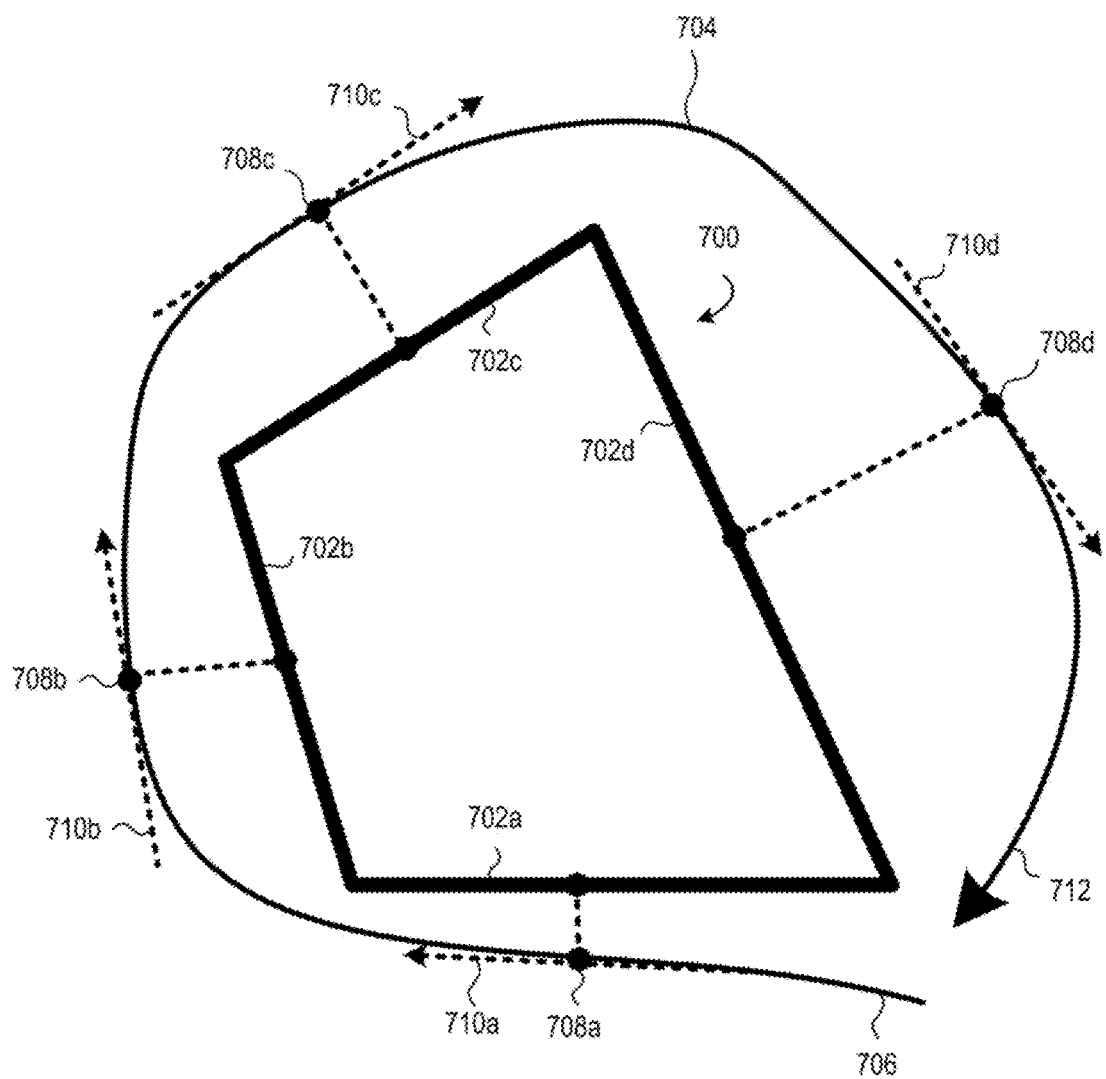
FIG. 7 shows an example grouping of sorted and oriented toolpath segments in relation to an example guide curve in accordance with aspects of the present disclosures.
Figure 7:
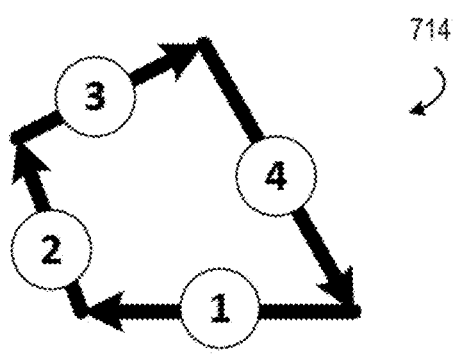
Figure 8:
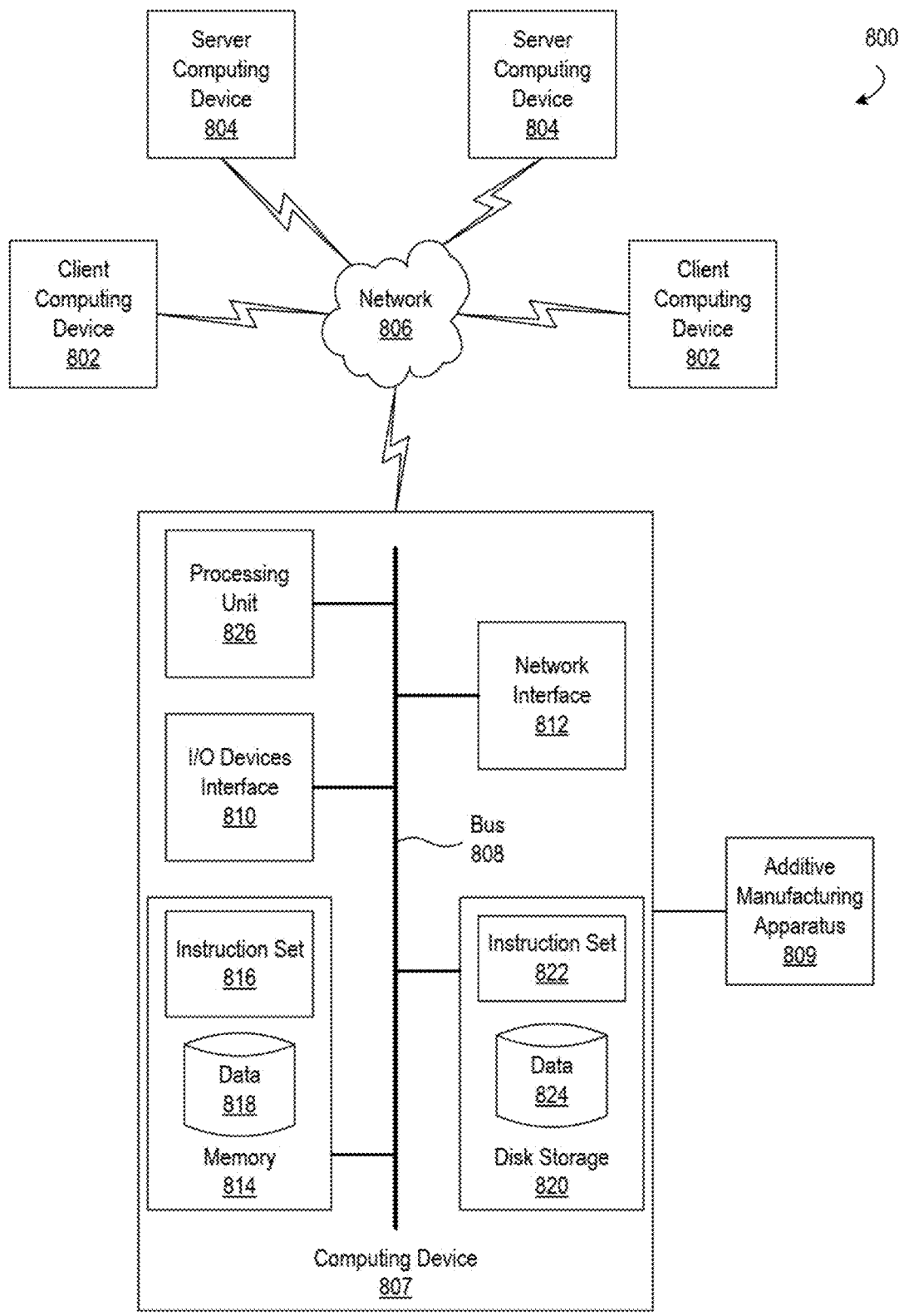
FIG. 8 is an illustration of an example computing environment in which aspects of the present disclosures may be implemented.

To illustrate using an elementary example with reference to FIG. 7, consider a group 700 of four toolpath segments 702*a-d* and a generally circular guide curve 704 having a generally clockwise direction and a starting point 706 near its base. The points 708*a-d* on the guide curve 704 closest to the toolpath segments 702*a-d* may include a respective point at each of the bottom, left, top, and right portions of the circular guide curve. Lines 710*a-d* tangential to the circular guide curve 7084 at these points 708*a-d* and in its clockwise direction may include respective lines directed leftward (line 710*a*), upward (line 710*b*), rightward (line 710*c*), and downward (line 710*d*). The group of toolpath segments 702*a-d*, in this example, may be sorted such that the toolpath segment 702*a* near the base and starting point 706 of the circular guide curve 704 is the first toolpath segment, the toolpath segment 702*b* near the left portion of the guide curve and the toolpath segment 702c near the top portion of the guide curve are the next toolpath segments respectively, and the toolpath segment 702d near the right portion and end 712 of the guide curve is the last toolpath segment. The group of toolpath segments 702a-d, in this example, may also be oriented such that the toolpath segment 702a is oriented leftward in the same direction as line 710a tangential to the guide curve 704 at point 708a, toolpath segment 702b is oriented upward in the same direction as line 710b tangential to the guide curve at point 708b, toolpath segment 702c is oriented rightward in the same direction as line 710c tangential to the guide curve at point 708c, and toolpath segment 702d is oriented downward in the same direction as line 710d tangential to the guide curve at point 708d. The resulting group 714 of sorted and oriented toolpath segments is also shown in FIG. 8.

Referring back to FIG. 6A, as discussed above, a group of toolpath segments may be associated with a selected sequence of surfaces and/or boundary representations of the 3D model (606-2: NO). In this circumstance, the group of toolpath segments may be sorted based on the selected sequence of surfaces and/or boundary representations (S606-5). The sorted order of the toolpath segments may match the selected sequence such that each toolpath segment is sorted according to the position of its corresponding surface and/or boundary representation in the sequence. For example, a toolpath segment associated with the first selected surface and/or boundary representation may be first in the sorted grouping of toolpath segments. If there are multiple segments associated with the first surface selected in the sequence, the sorting may be performed based on the internal parametrization of the geometry. The geometry is preferably constructed in a certain order and with a certain direction in order to determine the parametrization of the geometry (which may then be used to order the segments).

Alternatively, in the event of multiple segments being associated with the first surface selected in the sequence, the skilled person may evaluate a preference manually taking into account the criteria mentioned herein and their insight and experience, although of course it is contemplated that software tools can facilitate this decision-making process as well.

The sorted toolpath segments may then be oriented (S606-6). The orientation of the toolpath segments may be based on default criteria or specified criteria (e.g., specified manufacturing constraints). For example, the sorted toolpath segments may be oriented to minimize the travel distance of the nozzle during manufacture. As another example, the toolpath segments may be oriented to avoid any crossings of the manufacturing toolpath during manufacture. As a further example, the toolpath segments may be oriented to satisfy a threshold layer time. The toolpath segments may be oriented based on additional or alternative criteria that will be appreciated with the benefit of the present disclosures.

Having grouped, sorted, and oriented the toolpath segments for each slice of the 3D model, corresponding additive manufacturing control instructions may be generated for the toolpath segments (S607). A toolpath processor (e.g., toolpath processor 410 of FIG. 4) may generate the additive manufacturing control instructions. One or more sub-steps for step 607 in FIG. 6B may be repeated for each slice resulting from the slicing procedure. A slice of the 3D model may be selected (S607-1), and a group of sorted and oriented toolpath segments associated with the selected slice may be selected (S607-2). As noted above, one or more groups of toolpath segments may be associated with a given slice of the 3D model. Accordingly, each group of toolpath segments may correspond to one manufacturing path used to manufacture at least a portion of a layer of the part to be manufactured.

A toolpath segment from the group of selected to path segments may be selected (S607-3) and one or more additive manufacturing control instructions may be generated corresponding to the selected toolpath segment. The additive manufacturing control instructions may be appended to an additive manufacturing control file (S608), e.g., as each individual instruction is generated. As noted above, the additive manufacturing control instructions may include G-code.

The type of manufacturing control instruction generated may depend on whether the selected toolpath segment is continuous with the toolpath segment that precedes it in the sorted group of toolpath segments (S607-4). If the selected toolpath segment is not continuous with its immediately preceding toolpath segment (S607-4: NO), then a travel instruction may be generated (S607-5) that instructs the additive manufacturing apparatus to move the nozzle to the start of the selected toolpath segment. Generating the a travel instruction may include determining the appropriate coordinates corresponding to the start of the selected toolpath segment and calculating one or more rotations of the nozzle. The coordinates may be absolute or relative. If, however, the selected toolpath segment is continuous with its immediately preceding toolpath segment (S607-4: YES), then one or more deposition instructions may be generated that instructs the additive manufacturing apparatus to deposit the build material along a specified toolpath. The deposition instruction(s) generated may depend on whether the selected toolpath segment is linear (i.e., straight) or curved (607-6). If the selected toolpath segment is linear (S607-6: LINEAR), then one deposition instruction may be generated for the selected toolpath segment (S607-7). If, however, the selected toolpath segment is curved (S607-6: CURVED), then the curve may be fragmented into multiple linear sub-segments (S607-8), and multiple deposition instructions may be generated (S607-7), e.g., one deposition instruction for each sub-segment of the fragmented curve. In some alternative examples, a single deposition instruction may be generated for multiple toolpath segments that are continuous with each other. Where a slice of the 3D model is associated with multiple groups of toolpath segments, sub-steps 607-3 through 607-7 may be repeated for each group of toolpath segments associated with the selected slice. Similarly, step 607 may be repeated for each slice of the 3D model. The additive manufacturing control file generated thus includes the additive manufacturing control instructions that control the toolpaths of an additive manufacturing apparatus according to the desired manufacturing paths during manufacture of the part.

Referring now to FIG. 8, an example of an implementation of a computing environment 800 in which aspects of the present disclosure may be implemented is shown. The computing environment may include both client computing devices 802 and server computing devices 804. The client computing devices 802 and server computing devices 804 may provide processing, storage, input/output devices, application programs, and the like. Client computing devices 802 may include, e.g., desktop computers, laptop computers, tablet computers, palmtop computers, smartphones, smart televisions, gaming consoles, and the like.

Client computing devices 802 and server computing devices 804 may implement one or more of the logical components discussed by way of example with reference to FIG. 4. For example, a client computing device 802 or a server computing device 804 may implement one or more of the 3D modeler 402, slicer 404, toolpath solver 406, toolpath processor 410, and/or performance simulator 408.

Client computing devices 802 may also be in signal communication to other computing devices, including other client devices computing devices 802 and server computing devices 804 via a network 806. The network 806 may be part of a remote access network, a wide area network (e.g., the Internet), a cellular network, a worldwide collection of computers, local area networks, and gateways that currently use respective protocols (e.g., FTP, HTTP, TCP/IP, etc.) to communicate with one another. Other electronic device architectures and computer network architectures may be selectively employed.

FIG. 8 also depicts a block diagram of a computing device 807 of the computing environment 800. The computing device 807 contains a bus 808 the computing device utilizes to transfer information among its components. The bus 808 connects different components of the computing device 807 (e.g., processor, disk storage, memory, input/output ports, network ports, etc.) and enables the transfer of information between those components. An I/O device interface 810 is connected to the bus 808. The I/O device interface 810 connects various input and output devices (e.g., keyboard, mouse, microphone, camera, displays, printers, speakers, etc.) to the computing device 807. A network interface 812 is also attached to the bus 808 and allows the computing device 807 to connect to various other devices attached to a network (e.g., network 806). The memory 814 provides volatile storage for one or more instruction sets 816 and data 818 used to implement aspects described herein. Disk storage 820 provides non-volatile storage for one or more instruction sets 822 (e.g., an operating system) and data 824 used to implement various aspects described herein. The processing unit 826 is also attached to the bus 808 and executes the instructions stored in the memory 814 and/or the disk storage 820. The instruction sets 816 and 822 as well as the data 818 and 824 include a computer program product, including a computer-readable medium (e.g., a removable storage medium such as one or more USB sticks, memory cards, DVD-ROM's. CD-ROM's, diskettes, tapes, etc.) that provides at least a portion of the software instructions for implementing aspects of the present disclosure. At least a portion of the instructions may also be downloaded via the network 806. As noted above, computer-readable media include all non-transitory computer-readable media and do not include transitory propagating signals.

The information received, generated, used, stored, and/or transferred by the computing device 807 may include the data discussed by way of example with reference to FIG. 4. Such data includes the 3D geometry data 416, the slicing parameters 418, the slice data 420, the toolpath data 422, the guide curve data 424, the layer data 426, the manufacturing parameters 428, the manufacturing control instructions 430, the load case data 432, the manufacturing constraint data 434, and the performance results 436.

The instruction sets 816 and data 818 used to implement the aspects described herein may include instructions sets and data corresponding to the logical components discussed by way of example with reference to FIG. 4. This includes the 3D modeler 402, the slicer 404, the toolpath solver 406, the toolpath processor 410, and the performance simulator 408. As discussed above, the instruction sets and data corresponding to these logical components may be distributed across multiple computing devices, e.g., client computing device 802 and server computing device 804.

The computing device 807 may also include or otherwise be a part of an additive manufacturing apparatus 809. The additive manufacturing apparatus 809 of FIG. 8 may be the same as or similar to the additive manufacturing apparatus 412 of FIG. 4. Accordingly, the computing device 807 may receive and store the manufacturing control instructions (e.g., as a manufacturing control file) and control the additive manufacturing apparatus 809 using those instructions during the additive manufacturing process.

While the disclosures above have been presented in the context of load-bearing structural objects, it should be appreciated that the techniques described herein are not limited to additive manufacturing of load-bearing structural objects. Rather, the techniques described herein may be employed in a wider variety of applications and contexts. For example, the disclosures provided herein may similarly be applied in the context of desktop publishing (e.g., 3D printing) to manufacture other types of objects (e.g., non-load-bearing objects) and in other additive manufacturing scenarios.

ADDITIONAL EXEMPLARY EMBODIMENTS

A first aspect of a first additional exemplary embodiment of the invention is an additive manufacturing system comprising:
one or more processors; and
memory storing computer-readable instructions that, when executed by the one or more processors, cause the additive manufacturing system to:
receive a 3D model of a structural object;
receive indication of one or more slicing parameters;
receive indication of one or more desired manufacturing paths along which to manufacture the structural object;
determine one or more manufacturing toolpath segments at least by slicing, based on the one or more slicing parameters, the 3D model;
generate, for a slice of the 3D model and based on the one or more manufacturing toolpath segments, one or more manufacturing toolpaths at least by:
sorting, based on the one or more desired manufacturing paths, the one or more manufacturing toolpath segments;
determining, for each manufacturing toolpath segment of the one or more manufacturing toolpath segments and based on the one or more desired manufacturing paths, an orientation of the manufacturing toolpath segment; and
generate, for the slice and based on the one or more manufacturing toolpath segments, manufacturing control instructions configured to control a toolpath of an additive manufacturing apparatus.

An additional aspect of the first additional exemplary embodiment is the system of the previous aspect, wherein the indication of the one or more desired manufacturing paths comprises a guide curve associated with the 3D model, and wherein the guide curve approximates a geometry of the 3D model.

An additional aspect of the first additional exemplary embodiment is the system of any of the previous aspects of the first additional exemplary embodiment, wherein the instructions, when executed by the one or more processors, further cause the additive manufacturing system to determine, for a manufacturing toolpath segment of the one or more manufacturing toolpath segments, a point on the guide curve that is closest to the manufacturing toolpath segment, wherein the sorting is based on the point determined, and wherein the orientation is based on a direction of a line tangential to the guide curve at the point.

An additional aspect of the first additional exemplary embodiment is the system of any of the previous aspects of the first additional exemplary embodiment, wherein the indication of the one or more desired manufacturing paths comprises a user-selected sequence of at least one of:
　at least one surface of the 3D model; or
　at least one boundary representation of the 3D model.

An additional aspect of the first additional exemplary embodiment is the system of any of the previous aspects of the first additional exemplary embodiment, wherein the instructions, when executed by the one or more processors, cause the additive manufacturing apparatus to determine the orientation of the manufacturing toolpath segment at least by determining an orientation that minimizes a travel distance of a nozzle of the additive manufacturing apparatus.

An additional aspect of the first additional exemplary embodiment is the system of any of the previous aspects of the first additional exemplary embodiment, wherein the instructions, when executed by the one or more processors, cause the additive manufacturing apparatus to generate the manufacturing control instructions at least by including, in the manufacturing control instructions and based on determining that a manufacturing toolpath segment of the one or more manufacturing toolpath segments is continuous with an immediately preceding manufacturing toolpath segment of the one or more manufacturing toolpath segments, a deposition instruction configured to cause the additive manufacturing apparatus to deposit build material along a portion of a layer of the structural object that corresponds to the manufacturing toolpath segment.

An additional aspect of the first additional exemplary embodiment is the system of any of the previous aspects of the first additional exemplary embodiment, wherein the instructions, when executed by the one or more processors, cause the additive manufacturing apparatus to generate the manufacturing control instructions at least by including, in the manufacturing control instructions and based on determining that a manufacturing toolpath segment of the one or more manufacturing toolpath segments is not continuous with an immediately preceding manufacturing toolpath segment of the one or more manufacturing toolpath segments, a travel instruction configured to cause the additive manufacturing apparatus to move a nozzle to a position at a layer of the structural object that corresponds to a start of the manufacturing toolpath segment.

An additional aspect of the first additional exemplary embodiment is the system of any of the previous aspects of the first additional exemplary embodiment, wherein the instructions, when executed by the one or more processors, further cause the additive manufacturing system to receive indication of one or more additive manufacturing parameters; and
the instructions, when executed by the one or more processors, cause the additive manufacturing apparatus to generate the manufacturing control instructions further based on the indication of the one or more additive manufacturing parameters.

An additional aspect of the first additional exemplary embodiment is the system of any of the previous aspects of the first additional exemplary embodiment, wherein:
　the 3D model indicates a direction of expected mechanical stress on the structural object; and at least a portion of a desired manufacturing path of the one or more desired manufacturing paths substantially follows the direction of the expected mechanical stress.

An additional aspect of the first additional exemplary embodiment is the system of any of the previous aspects of the first additional exemplary embodiment, further comprising the additive manufacturing apparatus, and wherein the instructions, when executed by the one or more processors, further cause the additive manufacturing system to manufacture the structural object at least by:
　providing, to the additive manufacturing apparatus, the manufacturing control instructions; and
　controlling, using the manufacturing control instructions, a toolpath of the additive manufacturing apparatus during manufacture of the structural object.

An additional aspect of the first additional exemplary embodiment is the system of any of the previous aspects of the first additional exemplary embodiment, wherein the instructions, when executed by the one or more processors, further cause the additive manufacturing system to:
　perform, based on the 3D model, a simulation of a load condition on the structural object; and
　modify, based on one or more results of the simulation, at least one of:
　　the 3D model;
　　the one or more slicing parameters; or
　the one or more desired manufacturing paths.

An additional aspect of the first additional exemplary embodiment is the system of any of the previous aspects of the first additional exemplary embodiment, wherein the instructions, when executed by the one or more processors, further cause the additive manufacturing system to:
　receive indication of an estimated layer duration, wherein the estimated layer duration indicates an estimated duration of completing manufacture of a layer of the structural object based on a desired manufacturing path of the one or more desired manufacturing paths;
　receive indication of a desired layer time, wherein the desired layer time indicates a desired duration between starting manufacture of a first layer of the structural object and starting manufacture of a second layer of the structural object; and
　based on determining the estimated layer duration exceeds the estimated desired layer time, modify at least one of:
　　the 3D model;
　　the one or more slicing parameters; or
　the one or more desired manufacturing paths.

An additional aspect of the first additional exemplary embodiment is the system of any of the previous aspects of the first additional exemplary embodiment, wherein the wherein the desired layer time is derived using at least one stored material property characteristic associated with a build material from which at least a portion of the three-dimensional object is to be built; wherein the at least one stored material property characteristic comprises a fusion characteristic.

An additional aspect of the first additional exemplary embodiment is the system of any of the previous aspects of the first additional exemplary embodiment, wherein the instructions, when executed by the one or more processors, further cause the additive manufacturing apparatus to:
　determine whether a desired manufacturing path of the one or more desired manufacturing paths corresponds to a continuous manufacturing toolpath; and
　based on determining that the desired manufacturing path does not correspond to a continuous manufacturing toolpath, modify at least one of:

the 3D model;
the one or more slicing parameters; or
the one or more desired manufacturing paths.

An additional aspect of the first additional exemplary embodiment is the system of any of the previous aspects of the first additional exemplary embodiment, wherein the instructions, when executed by the one or more processors, further cause the additive manufacturing apparatus to:
perform, based on the 3D model, a simulation of one or more manufacturing constraints on manufacture of the structural object; and
modify, based on one or more results of the simulation, at least one of:
the 3D model;
the one or more slicing parameters; or
the one or more desired manufacturing paths.

An additional aspect of the first additional exemplary embodiment is the system of any of the previous aspects of the first additional exemplary embodiment, wherein the one or more manufacturing constraints comprise at least one of:
a physical property of the structural object; or
a condition of the toolpath of the additive manufacturing apparatus.

An additional aspect of the first additional exemplary embodiment is the system of any of the previous aspects of the first additional exemplary embodiment, wherein the one or more slicing parameters comprise at least one of:
an orientation of a plane used to slice the 3D model;
a shape of a curve used to slice the 3D model; or
a thickness of a layer of the 3D model.

Although the disclosures above are discussed by way of example, aspects of those disclosures (e.g., features, steps, etc.) may, in various implementations, be combined, divided, omitted, rearranged, reordered, modified, and/or supplemented as desired. In this regard, aspects of one example implementation may be included in other example implementations. Alternatives, modifications, and improvements are contemplated to be within the disclosures above, even if not expressly stated, and are intended to be within the spirit and scope of those disclosures. The above disclosures, therefore, provide examples and are not limiting.

What is claimed is:

1. A method of manufacturing a part via additive manufacturing, the method comprising:
receiving a 3D model of a structural object;
receiving indication of one or more slicing parameters;
receiving indication of one or more desired manufacturing paths along which to manufacture the structural object;
determining one or more manufacturing toolpath segments at least by slicing, based on the one or more slicing parameters, the 3D model;
generating, for a slice of the 3D model and based on the one or more manufacturing toolpath segments, one or more manufacturing toolpaths at least by:
sorting, based on the one or more desired manufacturing paths, the one or more manufacturing toolpath segments;
determining, for each manufacturing toolpath segment of the one or more manufacturing toolpath segments and based on the one or more desired manufacturing paths, an orientation of the manufacturing toolpath segment;
generating, for the slice and based on the one or more manufacturing toolpath segments, manufacturing control instructions configured to control a toolpath of an additive manufacturing apparatus to create at least a portion of a three-dimensional object, and
forming successive layers of a material according to the topology of the structure-bearing structure along a direction of the toolpath of the additive manufacturing apparatus to create the load-bearing structure, wherein
the 3D model is associated with data which indicates a direction of expected mechanical stress on the structural object; and
at least a portion of a desired manufacturing path of the one or more desired manufacturing paths substantially follows the direction of the expected mechanical stress.

2. The method of claim 1, wherein the load-bearing structure comprises one or more elements of buildings, tunnels, roads, bridges, walls, or dams.

3. The method of claim 1, wherein the load-bearing structure comprises a structural truss for a bridge.

4. The method of claim 1 wherein the material comprises fiber-reinforced build material.

5. The method of claim 4, wherein the fibers lie along the direction of the toolpath as they are being deposited while forming the successive layers.

6. The method of claim 5, wherein the toolpath of an additive manufacturing apparatus comprises a guide curve associated with the 3D model of the load-bearing structure, and wherein the guide curve approximates a geometry of the 3D model of the load-bearing structure.

7. The method of claim 5, wherein at least one manufacturing toolpath segment is generated upon a point on the guide curve that is closest to the manufacturing toolpath segment, wherein the sorting is based on the point determined, and wherein the orientation is based on a direction of a line tangential to the guide curve at the point.

8. The method of claim 1, and further comprising:
identifying multiple potential manufacturing toolpaths,
evaluating the time needed to complete each of them, and
selecting one to use for manufacture of the part based on the desired layer time and any manufacturing parameters.

9. The method of claim 1, wherein the indication of the one or more desired manufacturing paths comprises a user-selected sequence of at least one of:
at least one surface of the 3D model; or
at least one boundary representation of the 3D model.

10. The method of claim 1, wherein the toolpath segments are oriented to minimize a travel distance of a nozzle during manufacture.

11. The method of claim 1, wherein the load-bearing structure comprises a bridge truss.

* * * * *